US010117142B2

(12) United States Patent
Padfield et al.

(10) Patent No.: US 10,117,142 B2
(45) Date of Patent: Oct. 30, 2018

(54) MODELING MOBILE NETWORK PERFORMANCE

(71) Applicant: Viavi Solutions UK Limited, Berkshire (GB)

(72) Inventors: David Charles Padfield, Wiltshire (GB); Mohsen Zadeh-Koochak, Woolton Hill (GB); Howard John Thomas, Stonehouse (GB); Walter Featherstone, Cirencester (GB)

(73) Assignee: VIAVI Solutions UK Limited, Berkshire (GB)

( * ) Notice: Subject to any disclaimer, the term of this patent is extended or adjusted under 35 U.S.C. 154(b) by 55 days.

(21) Appl. No.: 14/839,569

(22) Filed: Aug. 28, 2015

(65) Prior Publication Data

US 2017/0064591 A1 Mar. 2, 2017

(51) Int. Cl.
*H04W 4/00* (2018.01)
*H04W 36/00* (2009.01)
(Continued)

(52) U.S. Cl.
CPC ....... *H04W 36/0088* (2013.01); *H04W 24/02* (2013.01); *H04W 24/06* (2013.01);
(Continued)

(58) Field of Classification Search
None
See application file for complete search history.

(56) References Cited

U.S. PATENT DOCUMENTS

2014/0120930 A1* 5/2014 Harris ................... H04W 24/08
455/452.1
2014/0206341 A1* 7/2014 Siomina ............ H04W 36/0088
455/422.1

(Continued)

FOREIGN PATENT DOCUMENTS

WO WO 2014/067700 5/2014

OTHER PUBLICATIONS

Ramiro et al., "Multi-Technology Self-Optimization", John Wiley & Sons, Ltd (2011), 76 pages.
(Continued)

*Primary Examiner* — Willie J Daniel, Jr.
(74) *Attorney, Agent, or Firm* — Harrity & Harrity, LLP

(57) ABSTRACT

A device obtains uplink information associated with a base station and obtains downlink information associated with a mobile device in communication with the base station. The device determines observed network performance information based on the uplink information and the downlink information and determines a predictive model, based on the uplink information and the downlink information, to predict network performance information. The device also changes network configuration data, associated with the base station, to generate changed network configuration data and determines predicted network performance information for the changed network configuration data based on the predictive model. The device further selectively transmits the changed network configuration data, to the base station, based on comparing the predicted network performance information and the observed network performance information.

20 Claims, 17 Drawing Sheets

(51) Int. Cl.
*H04W 36/20* (2009.01)
*H04W 72/04* (2009.01)
*H04W 36/16* (2009.01)
*H04W 24/02* (2009.01)
*H04W 24/06* (2009.01)
*H04W 24/10* (2009.01)

(52) U.S. Cl.
CPC ......... *H04W 36/165* (2013.01); *H04W 36/20* (2013.01); *H04W 72/0406* (2013.01); *H04W 24/10* (2013.01)

(56) References Cited

U.S. PATENT DOCUMENTS

| | | | |
|---|---|---|---|
| 2015/0043386 A1* | 2/2015 | Racz | H04L 41/044 370/255 |
| 2015/0092744 A1* | 4/2015 | Singh | H04W 36/22 370/331 |
| 2015/0365206 A1* | 12/2015 | Yaacoub | H04L 5/0035 370/329 |

OTHER PUBLICATIONS

European Search Report for European Application No. 16185756; dated Dec. 5, 2016, 7 pages.

\* cited by examiner

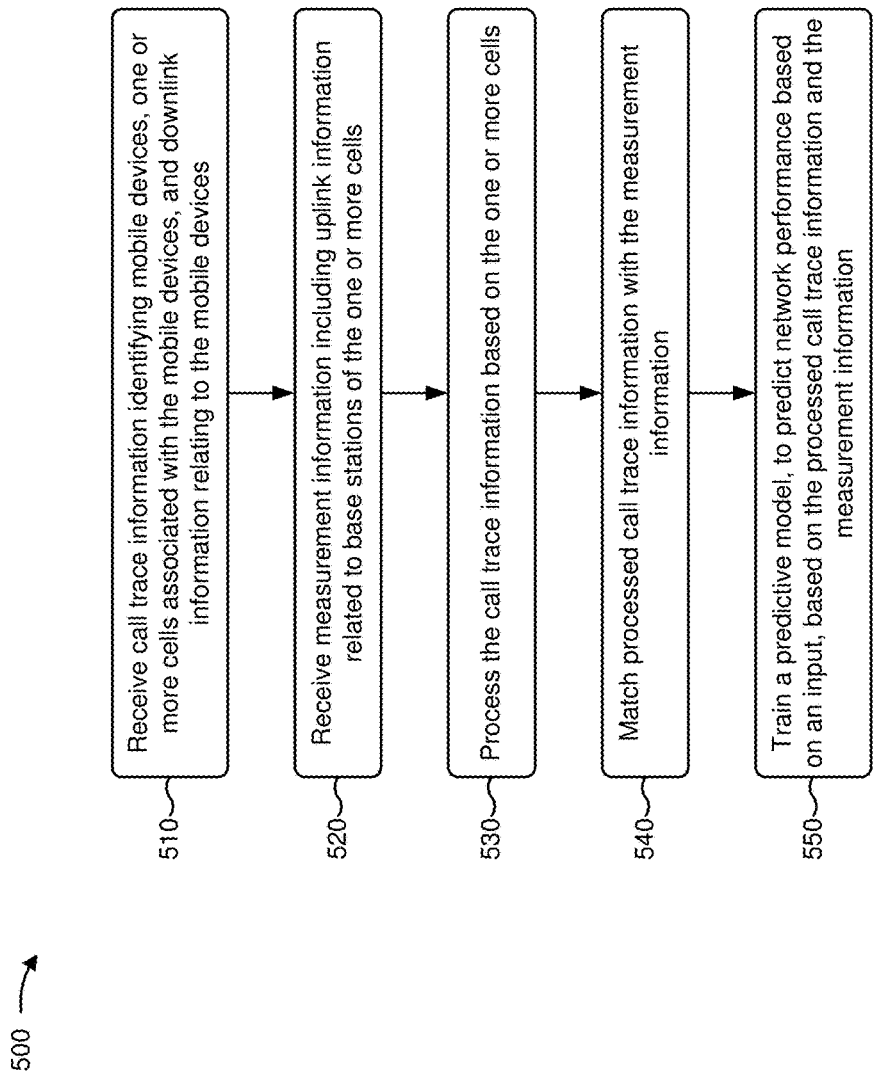

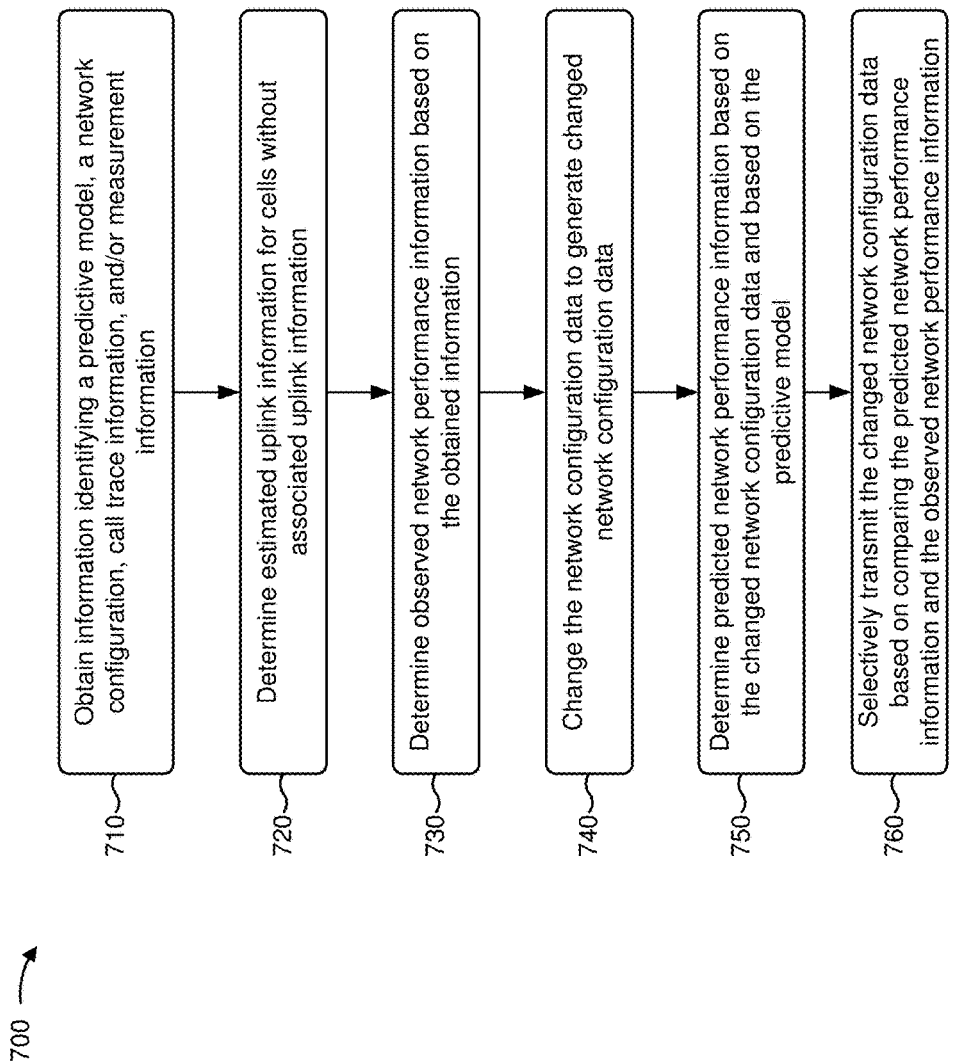

MODELING MOBILE NETWORK PERFORMANCE

BACKGROUND

Mobile devices, such as smart phones, tablet computers, laptop computers, and other electronic hand-held devices, are becoming increasingly popular. In order to support the growing number of mobile devices, mobile networks (e.g., third generation (3G) and fourth generation (4G) mobile networks) employ radio network subsystems with macro cells using one or more high-powered base stations. Although advances in technology have made it possible for these base stations to cover relatively large geographical areas to improve mobile communications, this is a one-size-fits-all approach that may not adequately leverage network resources to fully optimize a mobile network for mobile communications.

With the advent of fifth generation (5G) systems that further develop the technology of network-function virtualization (NFV) and software-defined networking (SDN), the concept of delivering network infrastructure as a service (NaaS) is being introduced. Such networks may support multi-tenancy and may include an infrastructure that supports multiple operators of different types. Consequently, an individual operator's scope of control may be constrained to one or more portions or "slices" of the network infrastructure subject to an agreement with the infrastructure owner to receive the NaaS. Therefore, different users for a self-optimizing network (SON) may target one or more individual slices of the network, where each network slice may include a different set of network functions.

BRIEF DESCRIPTION OF THE DRAWINGS

FIG. 5 is a flow chart of an example process for training a predictive model based on call trace information, measurement information, and/or configuration information;

FIG. 7 is a flow chart of an example process for configuring a mobile network based on a predictive model;

DETAILED DESCRIPTION

Figure 1A:
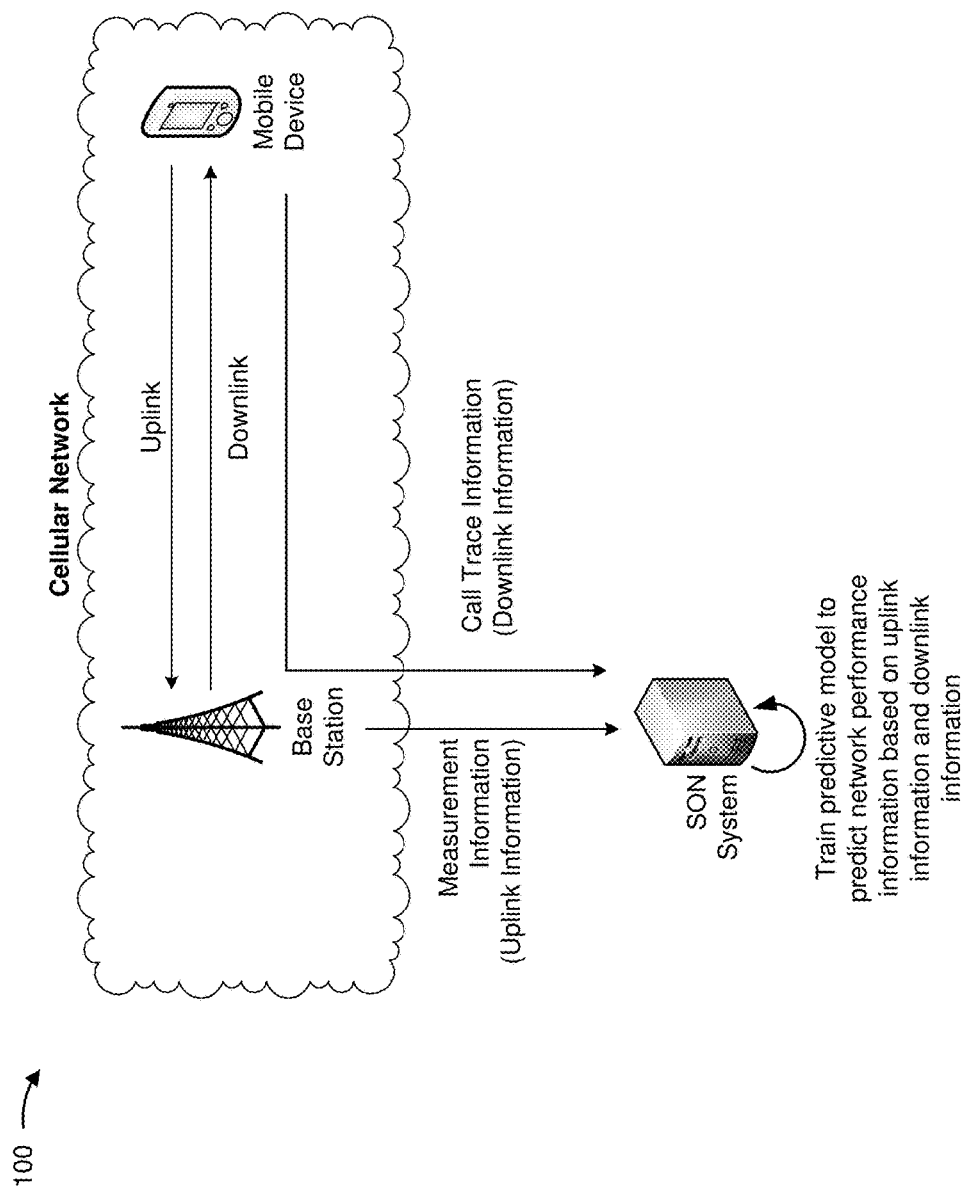
FIGS. 1A-1C are diagrams of an overview of an example implementation described herein.

The following detailed description of example implementations refers to the accompanying drawings. The same reference numbers in different drawings may identify the same or similar elements.

Current mobile networks may fail to fully utilize detailed knowledge of users, the users' mobile devices, and other specific information to better allocate network resources in order to implement a more efficient, focused, and customized network plan. A self-organizing or self-optimizing network (SON) system may use various mechanisms to determine whether a mobile network is performing to a desired level (e.g., optimally, at a desired Quality of Service (QoS), etc.) for a given set of traffic conditions. A base station of a mobile network may contain configuration parameters that control various aspects of a cell site of the mobile network. The SON system may alter these parameters to change network behavior, based on measurements obtained by the base station (e.g., uplink information), call trace information associated with a mobile device (e.g., downlink information), or other acquired data. For example, the SON system may automatically alter various network parameters if such changes would lead to a better user experience for some or all users. The network parameters may include transmit power levels, neighbor cell relation tables, antenna electrical tilts, antenna pointing direction/angles (e.g., elevation, tilt, and/or azimuth), handover thresholds (e.g., a mobile device of a voice user on a heavily-used 4G network may be encouraged to perform a handover to a base station of another network in order to free up 4G resources), or the like.

The SON system may make changes to network configuration data in order to improve mobile network performance. For example, the SON system may adjust the network configuration data to alter cell sizes, to balance a load across the mobile network, to improve overall mobile network capacity, to improve overall mobile network coverage, to mitigate interference, or the like. However, some changes may lead to a better outcome than other changes. For example, a first network configuration may cause a greater improvement to mobile network capacity than a second network configuration. Without information describing both uplinks (i.e., data transmitted from mobile devices to the base station) and downlinks (i.e., data transmitted from the base station to mobile devices), the outcomes may be difficult or impossible to predict. Further, without the information describing both the uplinks and the downlinks, sources of interference (e.g., repeaters, harmonic interference, etc.) may be difficult to locate and mitigate.

Systems and/or methods, described herein, may provide a SON system that can model outcomes of network reconfiguration of a mobile network, such as a mobile network. The SON system may include an architecture that allows the SON system to receive measurement information, including uplink information, from base stations, and to receive call trace information, including downlink information, from the base stations. Based on the measurement information and the call trace information, the SON system may train predictive models. The predictive models may predict network performance based on observed measurement information and/or call trace information, may estimate missing measurement information/call trace information, and/or may be useful to identify and locate cellular interference (e.g., passive intermodulation products), and determine actions which may mitigate cellular interference. In this way, the SON system can predict outcomes of network reconfiguration, which improves performance of the network reconfiguration, increases mobile network capacity, and reduces mobile network interference.

Figure 1B:
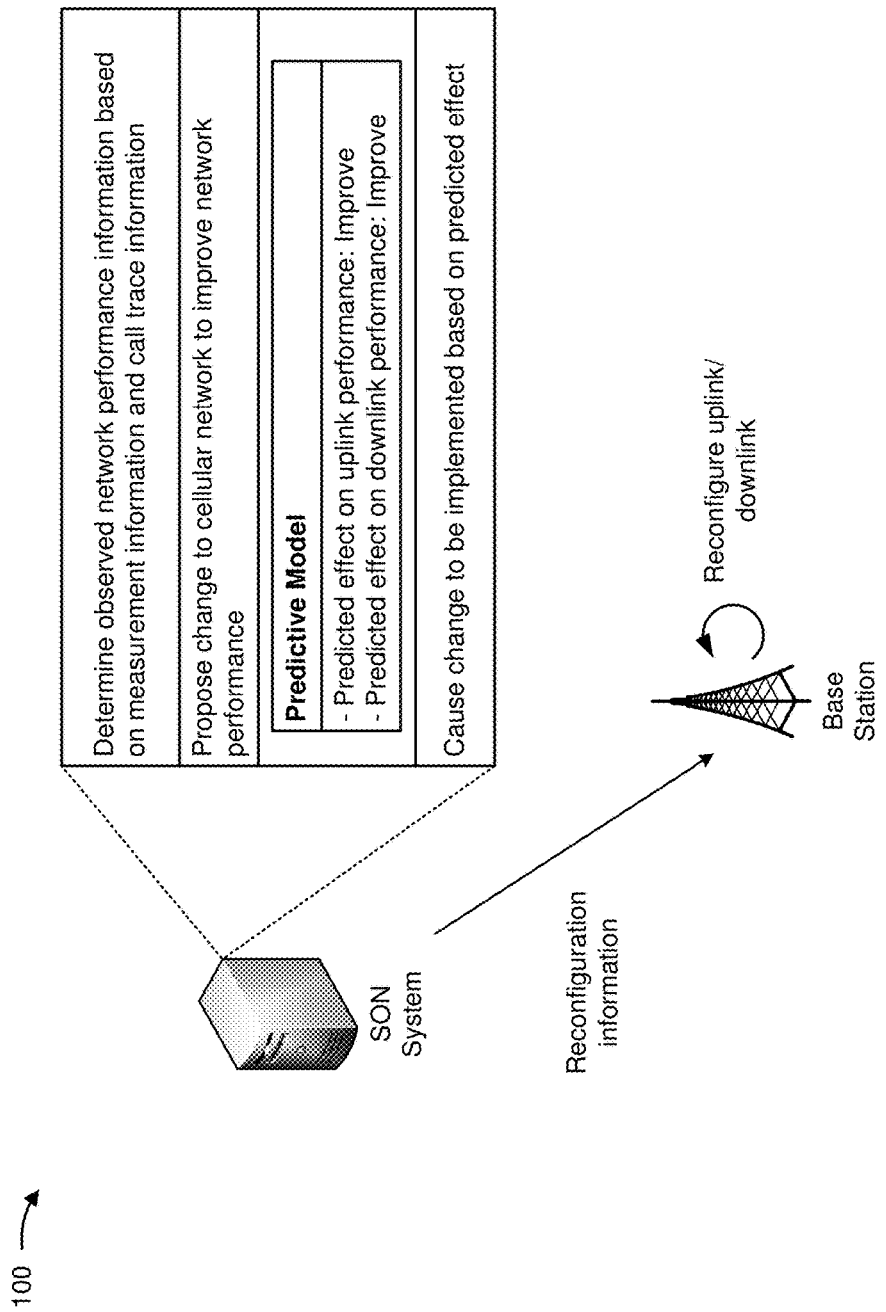
Figure 1C:
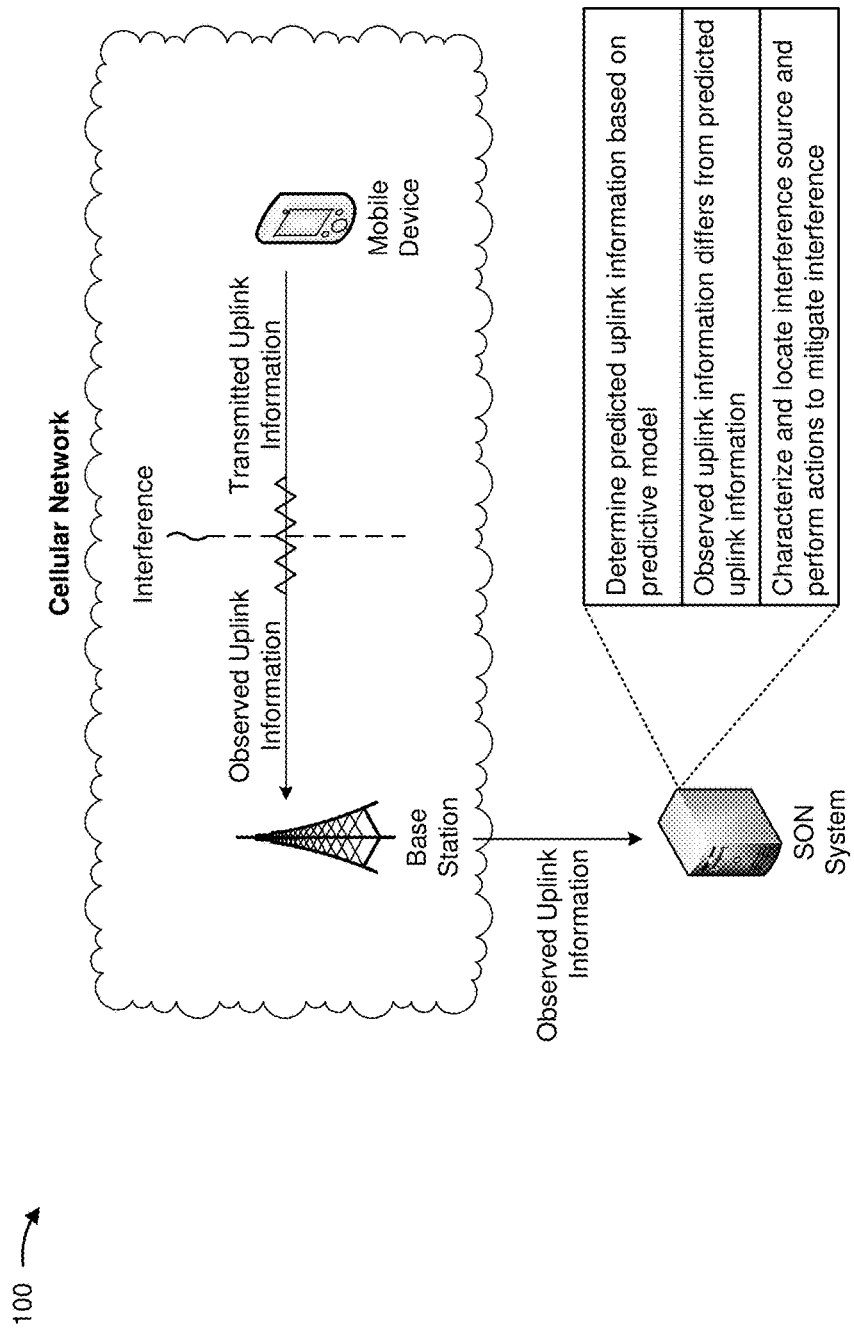

FIGS. 1A-1C are diagrams of an overview of an example implementation 100 described herein. As shown in FIG. 1A, a base station may communicate with a mobile device via an uplink (e.g., from the mobile device to the base station) and a downlink (e.g., from the base station to the mobile device).

As further shown, the base station may provide measurement information, including uplink information relating to the base station, to a SON system. As shown, the base station may provide call trace information, including downlink information relating to the mobile device, to the SON system.

As shown, the SON system may train a predictive model based on the uplink information and the downlink information. The predictive model may predict network performance information based on the uplink information and the downlink information. In some implementations, the predictive model may predict other information. For example, the predictive model may output estimated uplink information for base stations that do not provide uplink information to the SON system, or the like.

As shown in FIG. 1B, the SON system may determine observed network performance information based on the measurement information and the call trace information. The observed network performance information may include, for example, an uplink/downlink received signal strength indicator, a percentage of dropped calls, a modulation and coding scheme, or the like. As further shown, the SON system may propose a change to the mobile network to cause a network performance improvement. As shown, the SON system may use the predictive model to predict whether the proposed change improves performance with regard to the uplink and the downlink. Here, the proposed change improves performance with regard to the uplink and the downlink, so the SON system causes the proposed change to be implemented. As further shown, the SON system may cause the base station to reconfigure the uplink/downlink based on reconfiguration information to implement the proposed change. In this way, the SON system can change the mobile network configuration to improve network performance, and can predict an effect of the change to determine whether the change is worth implementing.

As shown in FIG. 1C, in some cases, interference may cause observed uplink information that is received by the base station to differ from uplink information transmitted by a mobile device. As further shown, to detect the interference, the SON system may determine predicted uplink information based on the predictive model determined in connection with FIG. 1A. As shown, the SON system may compare the observed uplink information to the predicted uplink information, and may identify the interference based on the observed uplink information differing from the predicted uplink information. As further shown, the SON system may characterize the interference (e.g., may determine a frequency of the interference, an amplitude of the interference, a wave pattern of the interference, whether a source of the interference is moving, etc.), may locate a source of the interference (e.g., based on information from the base station, based on information from several base stations, etc.), and may perform actions to mitigate the interference. In this way, the SON system identifies interference based on a predictive model, characterizes and locates the interference, and causes mitigating actions to be performed, which improves uplink performance and reduces interference at the base station.

Figure 2:
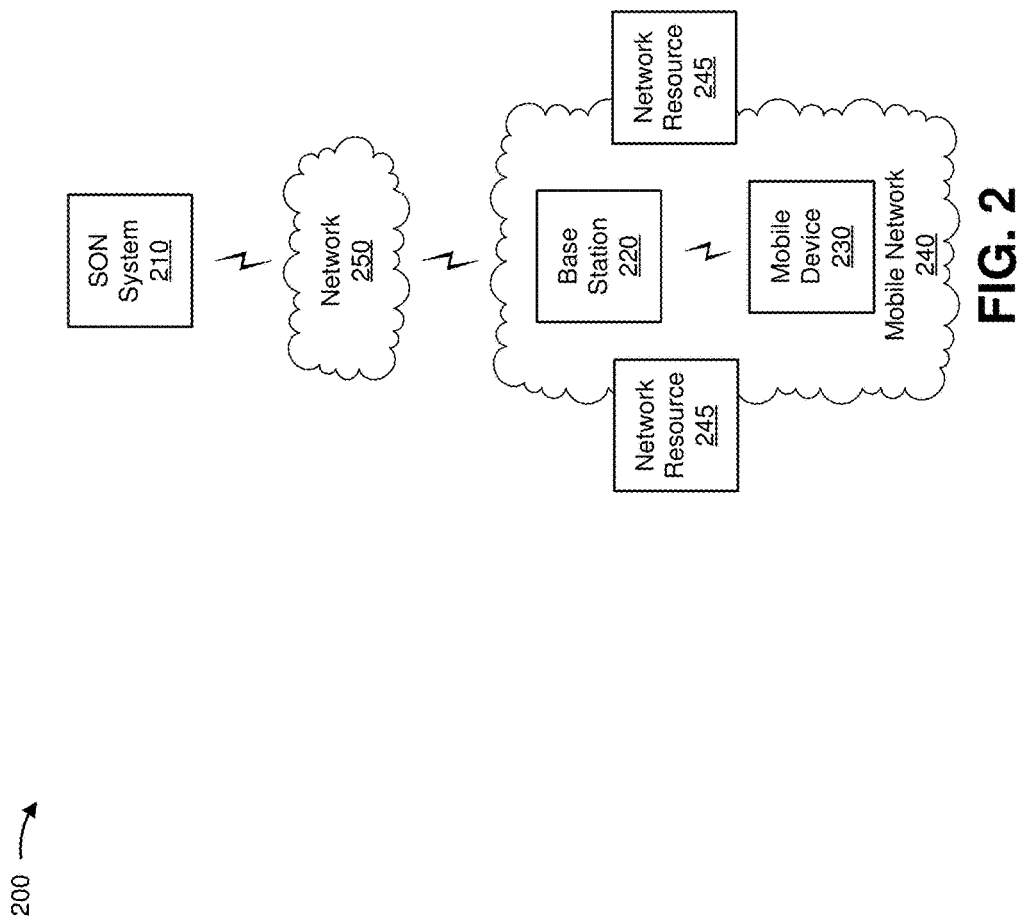
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a SON system 210, a base station 220, a mobile device 230, a mobile network 240 with network resources 245, and a network 250. Devices of environment 200 may interconnect via wired connections, wireless connections, or a combination of wired and wireless connections.

SON system 210 may include one or more devices capable of receiving, generating, storing, processing, and/or providing information, such as information described herein. For example, SON system 210 may include one or more computing devices, such as one or more server devices, desktop computers, workstation computers, virtual machines (VMs) provided in a cloud computing environment, or similar devices. In some implementations, SON system 210 may be utilized by an entity that manages and/or operates one or more portions of environment 200, such as, for example, a telecommunication service provider, a television service provider, an Internet service provider, or the like.

Base station 220 may include one or more devices capable of transferring traffic, such as audio, video, text, and/or other traffic, destined for and/or received from mobile device 230. In some implementations, base station 220 may include an eNB associated with an LTE network that receives traffic from and/or sends traffic to network 250. Additionally, or alternatively, one or more base stations 220 may be associated with a RAN that is not associated with the LTE network. Base station 220 may send traffic to and/or receive traffic from mobile device 230 via an air interface. In some implementations, base station 220 may include a small cell base station, such as a base station of a microcell, a picocell, and/or a femtocell. In some implementations, base station 220 may communicate with another base station 220 of mobile network 240 regarding measurement information, network performance information, or the like.

Mobile device 230 may include one or more devices capable of communicating with base station 220 and/or a network (e.g., mobile network 240, network 250, etc.). For example, mobile device 230 may include a wireless communication device, a radiotelephone, a personal communications system (PCS) terminal (e.g., that may combine a cellular radiotelephone with data processing and data communications capabilities), a smart phone, a smart meter, a vehicle, a vending machine, a laptop computer, a tablet computer, a personal gaming system, and/or a similar device. Mobile device 230 may send traffic to and/or receive traffic from network 250 (e.g., via base station 220).

Mobile network 240 may include a mobile communications network, such as 3G mobile network, a 4G mobile network, a heterogeneous network, and/or a combination of these or other types of networks. In some implementations, mobile network 240 may correspond to an evolved packet system (EPS) that includes an OSS, a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may include a base station (eNB). The EPC network may include a mobility management entity (MME), a serving gateway (SGW), a policy and charging rules function (PCRF), a PDN gateway (PGW), a base station controller (BSC), a radio network controller (RNC), an operations and maintenance centre (OMC), a network management system (NMS) and/or a network management center (NMC). The IMS network may include a home subscriber server (HSS), a proxy call session control function (P-CSCF), an interrogating call session control function (I-CSCF), and a serving call session control function (S-CSCF).

In some implementations, mobile network 240 may include one or more network resources 245, such as, for example, the OSS, the eNB, the MME, the SGW, the PCRF, the PGW, the HSS, the P-CSCF, the I-CSCF, the S-CSCF, or the like. In some implementations, network resources 245 may exchange information based on an interface (e.g., an X2 interface, a northbound interface (NBI), etc.).

Network 250 may include one or more wired and/or wireless networks. For example, network 250 may include a mobile network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, a private network, and/or a combination of these or other types of networks. In some implementations, network 250 may include one or more device-to-device wireless networks where communication may occur through direct communication between devices, under the control of network 250 or independently. In some implementations, direct device-to-device links may comprise one or more hops. Such direct device-to-device links may be used in a cooperative manner together with point-to-point and/or point-to-multi-point links mediated by network 250.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
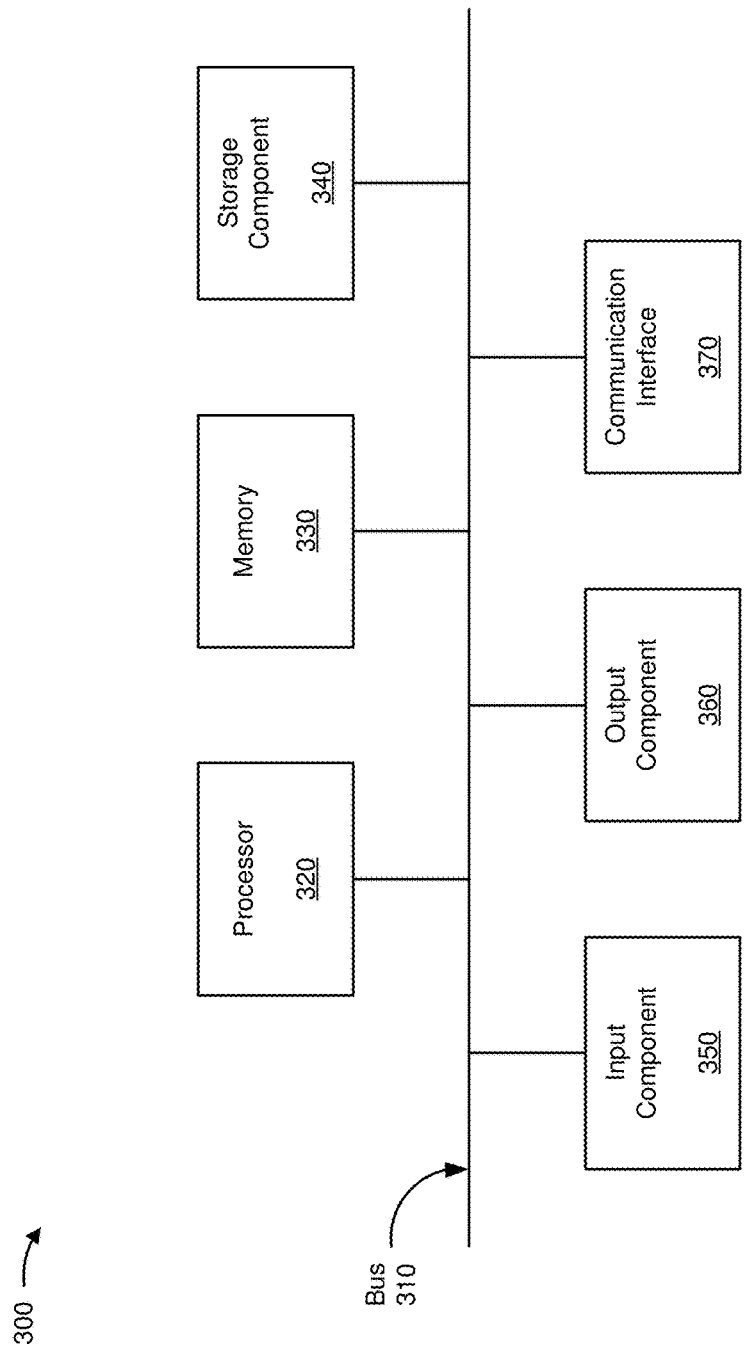
FIG. 3 is a diagram of example components of one or more devices of FIG. 2.

FIG. 3 is a diagram of example components of a device 300. Device 300 may correspond to SON system 210, base station 220, mobile device 230, and/or network resource 245. In some implementations, SON system 210, base station 220, mobile device 230, and/or network resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a mobile network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. For example, implementations described herein may be implemented based on network functions virtualization (NFV), a public (e.g., Internet) cloud computing environment, a private cloud computing environment, or the like.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
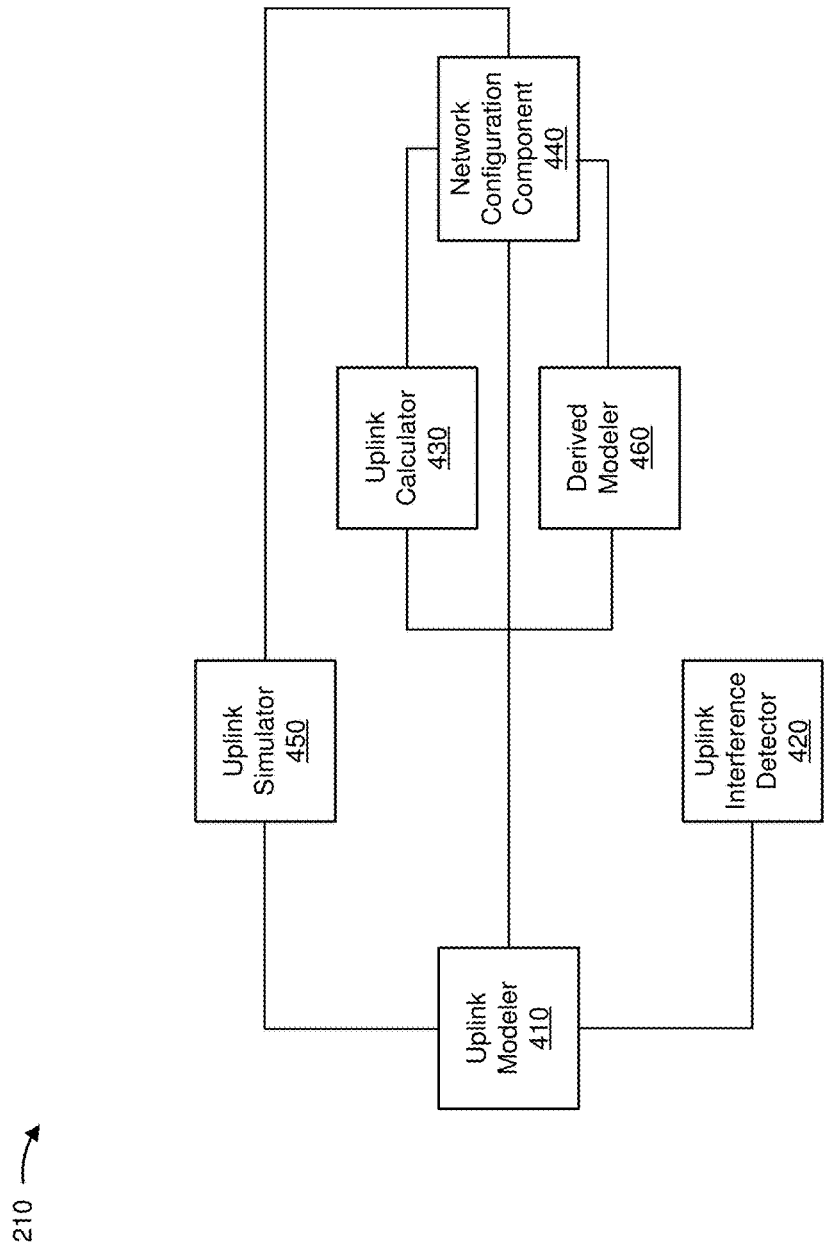
FIG. 4 is a diagram of example functional components of a self-optimizing network (SON) system depicted in FIG. 2.

FIG. 4 is a diagram of example functional components of SON system 210. As shown in FIG. 4, SON system 210 may include an uplink modeler 410, an uplink interference detector 420, an uplink calculator 430, a network configuration component 440, an uplink simulator 450, and a derived modeler 460.

Uplink modeler 410 may generate and/or train predictive models to predict network performance based on call trace information and/or measurement information. In some implementations, uplink modeler 410 may receive call trace information and/or measurement information, and may generate/train predictive models accordingly. Uplink modeler 410 may provide predictive models, call trace information, and/or measurement information to other components of SON system 210 (e.g., uplink interference detector 420, uplink calculator 430, network configuration component 440, uplink simulator 450, derived modeler 460, etc.). In some implementations, one or more functions of SON system 210 may be distributed and operate on network elements under a distributed control system. In some implementations, the one or more functions of SON system 210 may operate in a centralized manner. In such implementations, the one or more functions of SON system 210 may be determined by a centralized controlling node, may operate in a hybrid manner, or the like. In some implementations, uplink modeler 410 may perform the operations described above with regard to a downlink between base station 220 and mobile device 230.

Uplink interference detector 420 may detect interference in mobile network 240 based on a predictive model and based on measurement information. Uplink interference detector 420 may receive measurement information from base station 220 and/or uplink modeler 410, and may receive predictive models from uplink modeler 410. Uplink interference detector 420 may characterize and/or locate sources of interference, and may provide information and/or cause an action to be performed to notify a network administrator of the sources of interference, to mitigate the sources of interference, or the like.

Uplink calculator 430 may determine estimated measurement information for base stations 220 and/or areas (e.g., mobile network cells, geographic areas, etc.) for which actual measurement information is not satisfactory (e.g., not received, incomplete, inadequate, does not satisfy an accuracy threshold, etc.). Uplink calculator 430 may determine the estimated measurement information for a particular base station 220/area based on predictive models received from uplink modeler 410 and based on measurement information and/or call trace information (e.g., for base stations 220/areas near the particular base station 220/area, for base stations 220/areas with historically similar measurement information and/or call trace information to the particular base station 220/area, etc.). In some implementations, uplink calculator 430 may receive information identifying which measurement information to estimate from uplink modeler 410, network configuration component 440, or another component/device.

In some implementations, uplink calculator 430 may determine network performance information based on measurement information, call trace information, and/or predictive models received from uplink modeler 410. Uplink calculator 430 may provide the network performance information to network configuration component 440 or another component or device.

Network configuration component 440 may generate network configurations, and may predict network performance effects associated with the generated network configurations, based on measurement information, call trace information, predictive models, and/or uplink metrics. In some implementations, network configuration component 440 may receive measurement information, call trace information, and predictive models from uplink modeler 410, and may receive uplink metrics and/or estimated measurement information from uplink calculator 430. Network configuration component 440 may provide information and/or cause an action to be performed based on the predicted network performance effects and/or the generated network configurations. For example, network configuration component 440 may cause base station 220 and/or mobile device 230 to be reconfigured, may provide information to a network administrator, or the like. In some implementations, network configuration component 440 may generate and/or train predictive models relating to a downlink network configuration of base station 220.

Uplink simulator 450 may adjust uplink characteristics based on network configuration data generated by network configuration component 440. For example, uplink simulator 450 may receive information identifying updated network configuration data and call trace information/measurement information, and may adjust network configuration information to implement the updated network configuration data with regard to an uplink between base station 220 and mobile devices 230.

Derived modeler 460 may receive predictive models and call trace information from uplink modeler 410 and/or base station 220, and may derive one or more secondary predictive models based on the predicted models and the call trace information. In some implementations, derived modeler 460 may provide the secondary predictive models and/or information determined based on the one or more secondary predictive models to network configuration component 440.

The number and arrangement of functional components shown in FIG. 4 are provided as an example. In practice, SON system 210 may include additional functional components, fewer functional components, different functional components, or differently arranged functional components than those shown in FIG. 4. Additionally, or alternatively, a set of functional components (e.g., one or more functional components) of SON system 210 may perform one or more functions described as being performed by another set of functional components of SON system 210. For example, SON system 210 may interact with another SON system 210 associated with one or more other entities and/or mobile networks 240.

FIG. 5 is a flow chart of an example process 500 for training a predictive model based on call trace information, measurement information, and/or configuration information. In some implementations, one or more process blocks of FIG. 5 may be performed by SON system 210. In some implementations, one or more process blocks of FIG. 5 may be performed by another device or a group of devices separate from or including SON system 210, such as base station 220, mobile device 230, and network resources 245.

As shown in FIG. 5, process 500 may include receiving call trace information identifying mobile devices, one or more cells associated with the mobile devices, and downlink information relating to the mobile devices (block 510). For example, SON system 210 may receive call trace information. The call trace information may identify mobile devices 230 (e.g., based on a device identifier, such as an international mobile subscriber identity (IMSI), an international mobile station equipment identity (IMEI), a mobile device number (MDN), a subscriber identifier that identifies a subscriber associated with mobile device 230, or the like). The call trace information may identify the one or more cells based on a cell identifier, such as a cell global identity (CGI), an enhanced cell global identity (E-CGI), a location area code (LAC), or the like.

SON system 210 may receive the call trace information from base station 220, which may serve the one or more cells, and base station 220 may gather the call trace information for the mobile devices 230 associated with the one or more cells. For example, mobile devices 230 in the one or more cells may access mobile network 240 via base station 220, and base station 220 may determine the call trace information based on the mobile devices 230 accessing mobile network 240 via base station 220. Additionally, or alternatively, base station 220 may determine and provide the call trace information continuously.

Base station 220 may determine call trace information based on information that is collected by mobile devices 230. Base station 220 may determine call trace information at a particular interval (e.g., every thirty seconds, every one minute, every five minutes, every fifteen minutes, every thirty minutes, once per hour, daily, etc.), and may provide the call trace information to SON system 210. Additionally, or alternatively, SON system 210 may request the call trace information, and may receive the call trace information based on requesting the call trace information. In some implementations, SON system 210 may obtain call trace information from base station 220 and/or network resource 245 based on an application programming interface (API). For example, distributed nodes of SON system 210 may collect information based on the API, may determine call trace information based on the collected information, and may provide the call trace information to a central node of SON system 210.

In some implementations, the call trace information may include downlink information. The downlink information may relate to information received by and/or provided by mobile device 230. For example, the downlink information may include information relating to circuit-switched calls placed by mobile device 230 (e.g., a quantity of calls, a duration of calls, etc.), packet-switched calls received and/or provided by mobile device 230 (e.g., a quantity of calls, a duration of calls, etc.), Voice-over-LTE calls received and/or provided by mobile device 230 (e.g., a quantity of calls, a duration of calls, etc.), a transmit power level associated with mobile device 230, a downlink path loss between base station 220 and mobile device 230, a frequency associated with a downlink channel between base station 220 and mobile device 230, a downlink received signal code power (RSCP) associated with mobile device 230, a downlink received energy per chip (Ec) for mobile device 230, a downlink noise power density (NO) for mobile device 230, a received signal reference quality (RSRQ) for mobile device 230, a power headroom identifier for mobile device 230, a channel quality indication (CQI), a sub-band CQI, an estimate of a channel rank, information according to an E-UTRA standard (e.g., LTE 36.331, LTE 36.423 or the like.

As further shown in FIG. 5, process 500 may include receiving measurement information including uplink information related to base stations of the one or more cells (block 520). For example, SON system 210 may receive measurement information from base station 220. Base station 220 may be associated with the one or more cells identified by the call trace information. For example, base station 220 may serve mobile devices 230 associated with the one or more cells, and may provide measurement information relating to the one or more cells. In some implementations, base station 220 may determine measurement information at a particular interval (e.g., every five minutes, every fifteen minutes, once per hour, daily, etc.), and may provide the measurement information to SON system 210. Additionally, or alternatively, SON system 210 may request the measurement information, and may receive the measurement information based on requesting the measurement information. Additionally, or alternatively, base station 220 may provide the measurement information continuously. In some implementations, SON system 210 may obtain measurement information from base station 220 and/or network resource 245 based on an application programming interface (API). For example, distributed nodes of SON system 210 may collect information based on the API, may determine measurement information based on the collected information, and may provide the measurement information to a central SON system 210.

In some implementations, the measurement information may include uplink information. The uplink information may relate to information received by and/or provided by base station 220. For example, the uplink information may identify a frequency of a downlink channel provided by base station 220, an uplink RSSI associated with base station 220, an uplink SNR for information received by base station 220, an uplink modulation and coding scheme (MCS) associated with base station 220, a noise floor, a throughput associated with base station 220 (e.g., in bits per second, kilobits per second, megabits per second, a quantity of calls routable, a quantity of sessions that base station 220 can maintain, etc.), a downlink propagation loss for base station 220, a difference between an uplink channel frequency and a downlink channel frequency, a received total wideband power (RWTP), a training sequence code (TSC), a preamble, a cycle prefix, or the like.

In some implementations, the measurement information may relate to multiple base stations 220. For example, the multiple base stations 220 may intercommunicate (e.g., via an X2 interface, etc.) to determine measurement information for one or more cells. The measurement information relating to multiple base stations 220 may include, for example, one or more high uplink interference indicators, one or more uplink interference overload indicators, a relative narrowband transmit power of two or more base stations 220, an almost-blank-subframe (ABS) message transmitted between two or more base stations 220, intended uplink/downlink configuration information, cooperative multipoint information (CoMP information), a CoMP hypothesis, network assisted interference cancellation information, or the like. The measurement information may relate to a carrier, a sub-carrier, a sub-band, a resource block, and/or a cell.

In some implementations, SON system 210 may receive configuration information relating to the base stations 220 and/or the mobile devices 230. The configuration information may relate to a configuration of base station 220 and/or other network devices, based on which to provide network services. For example, the configuration information may include neighbor cell relation tables, antenna electrical tilts, antenna pointing direction/angles (e.g., elevation, tilt, and/or azimuth), handover thresholds, or the like. In some implementations, SON system 210 may receive the configuration information from base station 220. Additionally, or alternatively, SON system 210 may receive the configuration information from another source (e.g., network resource 245, a user input, a planning tool, etc.).

As further shown in FIG. 5, process 500 may include processing the call trace information based on the one or more cells (block 530). For example, SON system 210 may process the call trace information based on the one or more cells identified by the call trace information. In some implementations, SON system 210 may associate mobile devices 230, in a particular cell, with the particular cell and/or with a base station 220 that serves the particular cell. Additionally, or alternatively, SON system 210 may determine aggregate call trace information for a particular cell. For example, SON system 210 may combine call trace information from mobile devices 230 in a particular cell (e.g., by averaging the call trace information, etc.).

As further shown in FIG. 5, process 500 may include matching processed call trace information with the measurement information (block 540). For example, SON system 210 may match processed call trace information with measurement information. In some implementations, SON system 210 may match the processed call trace information with the measurement information based on the cell with which the call trace information and/or the measurement information are associated. For example, SON system 210 may match a particular base station 220, corresponding to a particular cell, with each mobile device 230 that the particular base station 220 serves (e.g., each mobile device 230 in the particular cell, each mobile device 230 that establishes a session with the particular base station 220, etc.). In this way, SON system 210 may associate uplink information for a particular cell and/or base station 220, with downlink information for the particular cell and/or base station 220, which improves accuracy of predicted network performance effects relating to the particular cell and/or base station 220.

In some implementations, SON system 210 may determine that certain information is missing, unusable, or the like. For example, SON system 210 may determine that a particular base station 220 has not provided measurement information, has provided distorted measurement information, or the like. In such a case, SON system 210 may estimate measurement information for the particular base station 220, as described in more detail in connection with FIG. 7, below.

As further shown in FIG. 5, process 500 may include training a predictive model, to predict network performance information based on an input, based on the processed call trace information and the measurement information (block 550). For example, SON system 210 may train one or more predictive models based on the processed call trace information and the measurement information. The one or more predictive models may predict network performance based on an input. For example, SON system 210 may input uplink information, downlink information, and/or configuration information to a predictive model, and the predictive model may output predicted network performance information. SON system 210 may generate and/or train the predictive model based on received measurement information, call trace information, and/or configuration information, as described in more detail above.

The predictive model may output predicted network performance information. The predicted network performance information may predict an uplink RSSI associated with base station 220, an uplink SNR for information received by base station 220, a throughput associated with base station 220 (e.g., in bits per second, kilobits per second, megabits per second, a quantity of calls routable, a quantity of sessions that base station 220 can maintain, etc.), or the like. In some implementations, the predictive model may output predicted network performance information for a set of mobile devices 230. For example, the predictive model may output an average predicted value of the above information, a fraction of mobile devices 230 that satisfy a threshold relating to the above information, or the like. In some implementations, SON system 210 may output statistical information relating to network performance information. For example, SON system 210 may output an average of a set of network performance information, a variance of a set of network performance information, an interquartile range of a set of network performance information, a standard deviation of a set of network performance information, a ratio of a set of network performance information that satisfies a particular threshold or a target value, or the like.

In some implementations, SON system 210 may generate a predictive model. For example, SON system 210 may receive call trace information and measurement information, and may generate a predictive model relating the call trace information and the measurement information. In some implementations, to generate a predictive model, SON system 210 may determine a correlation between an input variable (e.g., in call trace information and/or measurement information) and an output variable (e.g., in observed network performance information). SON system 210 may determine one or more operations to perform on the input variable to predict a value of the output variable. In this way, SON system 210 may generate a predictive model to predict network performance, based on call trace information, measurement information, and observed network performance information.

Additionally, or alternatively, SON system 210 may train an existing predictive model. For example, SON system 210 may predict a value of network performance information based on particular network configuration data, and may implement the particular network configuration data. SON system 210 may receive call trace information and/or measurement information after implementing the particular network configuration data. SON system 210 may determine observed network performance information based on the call trace information and/or measurement information, and may compare the observed network performance information to the predicted value of the network performance information. If the predicted value of the network performance information is inaccurate, SON system 210 may adjust the predictive model to improve accuracy of predicted network performance information. In this way, SON system 210 trains a predictive model, which improves accuracy of the predicted network performance information and thus improves network performance.

In some implementations, SON system 210 may generate/train a secondary predictive model based on an existing predictive model. For example, SON system 210 (e.g., derived modeler 460 of SON system 210) may receive a predictive model, and call trace information and/or measurement information for use as inputs to the predictive model. Assume that the predictive model outputs a predicted uplink RSSI based on call trace information and/or measurement information. In such a case, derived modeler 460 may determine a relationship between the predicted uplink RSSI and a secondary predicted value (e.g., a quantity of dropped calls observed at base station 220, a quantity of blocked calls observed at base station 220, etc.). Derived modeler 460 may, in some implementations, perform an analysis (e.g., a linear regression analysis, a multiple regression analysis, etc.) on the predicted uplink RSSI, the secondary predicted value, and one or more variables in the call trace information and/or measurement information, to generate a secondary predictive model. In this way, SON system 210 may generate a secondary predictive model to predict network performance information based on a predicted uplink RSSI, which increases a breadth of information that SON system 210 may predict, and improves network resiliency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
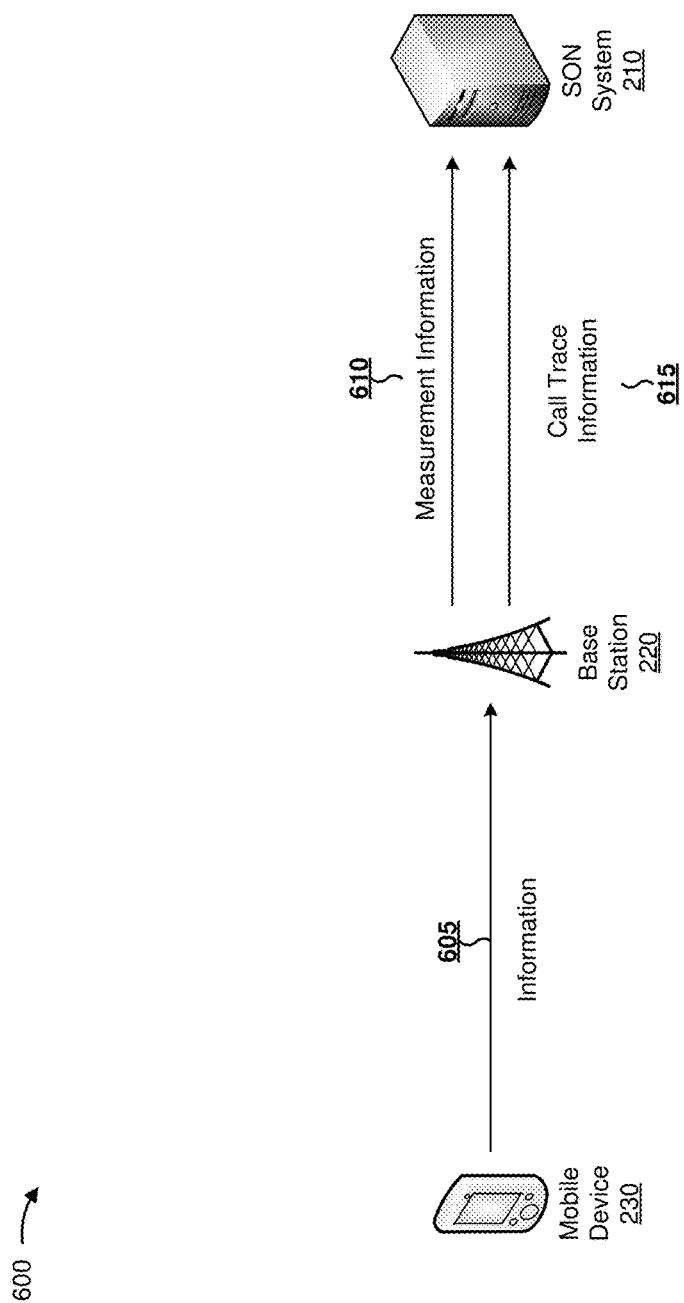
FIGS. 6A and 6B are diagrams of an example implementation relating to the example process shown in FIG. 5.
Figure 6B:
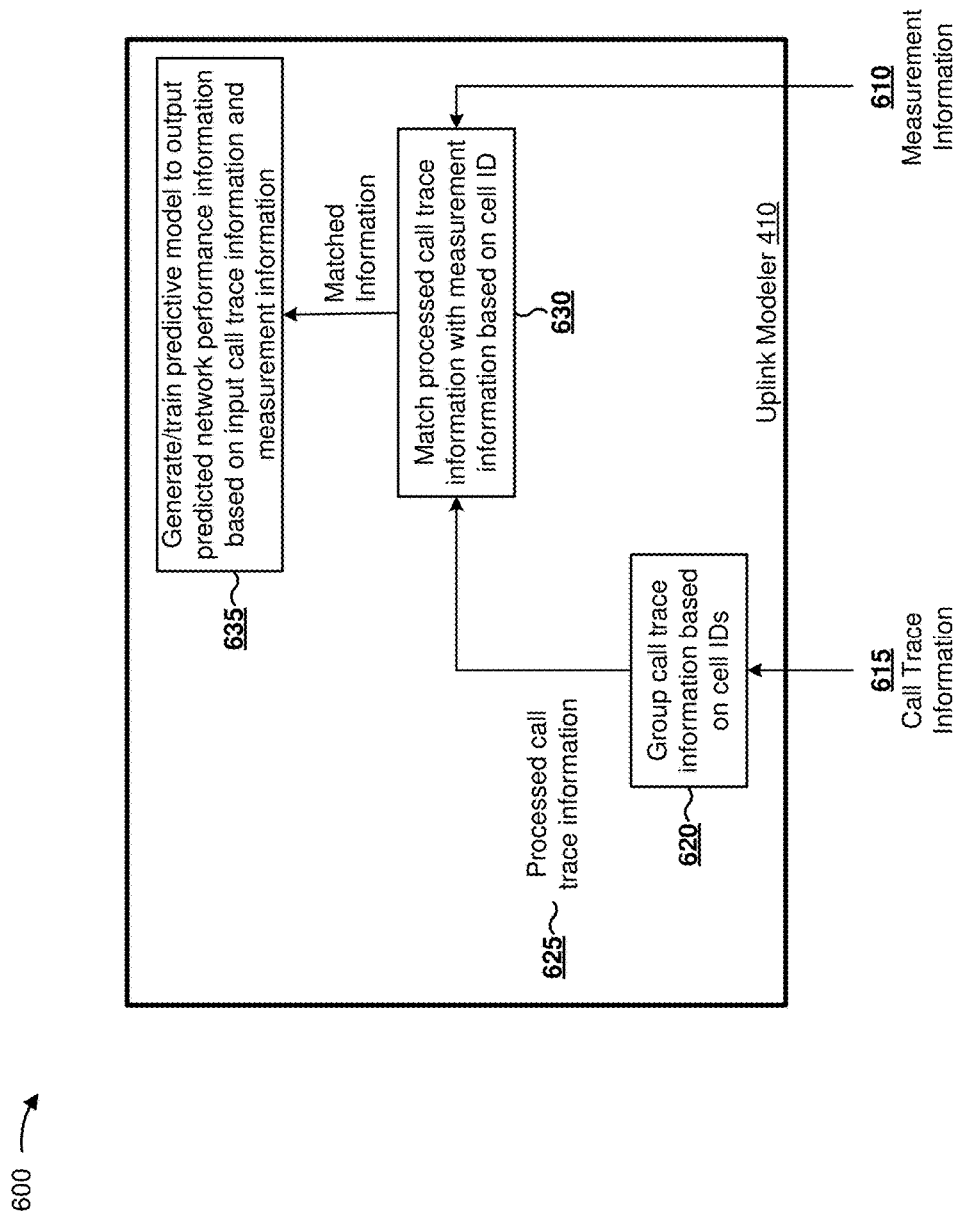

FIGS. 6A and 6B are diagrams of an example implementation 600 relating to example process 500 shown in FIG. 5. FIGS. 6A and 6B show an example of training a predictive model based on call trace information, measurement information, and/or configuration information.

As shown in FIG. 6A, mobile device 230 may periodically determine information 605 (e.g., an RXLEV value, an RXQUAL value, an RSCP value, an EcN0 value, an RSRP value, and an RSRQ value), and may provide the determined information 605 to base station 220. Base station 220 may provide measurement information 610 to SON system 210. The measurement information 610 may include uplink information relating to base station 220. As further shown, base station 220 may determine call trace information 615 based on the determined information 605, and may provide the call trace information 615 to SON system 210. In some implementations, base station 220 may provide call trace information 615 to SON system 210 via one or more network resources 245 (e.g., an intermediate controller node, management node, one or more mobile edge computing (MEC) resources, etc.). In situations where call trace information 615 is collected by one or more MEC resources, the one or more MEC resources may collect information from mobile devices 230, may process the information to determine call trace information 615, and may provide call trace information 615 to SON system 210.

As shown in FIG. 6B, uplink modeler 410 of SON system 210 receives measurement information 610 and call trace information 615. As shown by reference number 620, uplink modeler 410 groups call trace information 615 based on cell identifiers included in call trace information 615. For example, uplink modeler 410 may receive call trace information 615 for multiple mobile devices 230 and may group mobile devices 230 that are associated with the same cell identifiers. As shown by reference number 625, uplink modeler 410 may determine processed call trace information based on grouping the call trace information.

As shown by reference number 630, uplink modeler 410 may match processed call trace information 625 with measurement information 610 based on cell identifiers included in processed call trace information 625 and measurement information 610. For example, uplink modeler 410 may match measurement information 610, for a particular base station 220 and/or cell, with processed call trace information 625 for mobile devices 230 associated with the particular base station 220 and/or cell. As shown by reference number 635, uplink modeler 410 may generate/train a predictive model to output predicted network performance information based on measurement information 610 and call trace information 615.

As indicated above, FIGS. 6A and 6B are provided merely as an example. Other examples are possible and may differ from what was described with regard to FIGS. 6A and 6B.

FIG. 7 is a flow chart of an example process 700 for configuring a mobile network based on a predictive model. In some implementations, one or more process blocks of FIG. 7 may be performed by SON system 210. In some implementations, one or more process blocks of FIG. 7 may be performed by another device or a group of devices separate from or including SON system 210, such as base station 220, mobile device 230, and/or network resources 245.

As shown in FIG. 7, process 700 may include obtaining information identifying a predictive model, a network configuration, call trace information, and/or measurement information (block 710). For example, SON system 210 may obtain information identifying a predictive model, a network configuration, call trace information, and/or measurement information. In some implementations, SON system 210 may obtain the information identifying the network configuration, the call trace information, and/or the measurement information from base station 220, as described in more detail in connection with FIG. 5, above. In some implementations, SON system 210 may generate and/or train the predictive model, as described in more detail in connection with FIG. 5, above. In some implementations, SON system 210 may obtain the information identifying the predictive model, the network configuration, the call trace information, and/or the measurement information from another device. For example, another SON system 210, network resource 245, or another device may provide the information to SON system 210.

As further shown in FIG. 7, process 700 may include determining estimated uplink information for cells without associated measurement information (block 720). For example, SON system 210 may determine estimated uplink information for a cell that is associated with unsatisfactory (e.g., missing, inaccurate, incomplete, etc.) measurement information. The estimated uplink information may include projected values of uplink information (e.g., uplink information, as described in more detail in connection with FIG. 5, above). In some implementations, SON system 210 may determine the estimated uplink information based on the predictive model obtained in connection with block 710. For example, SON system 210 may input the call trace information for the cell to the predictive model, and may determine an output of the predictive model, including the estimated uplink information.

In some implementations, SON system 210 may determine the estimated uplink information for a particular cell based on uplink information for another cell. For example, SON system 210 may determine the estimated uplink based on uplink information for neighboring cells, based on uplink information for cells associated with similar mobile devices 230 and/or historically similar call trace information, based on another cell specified by a network administrator, based on an average of all cells monitored by SON system 210, or the like.

As further shown in FIG. 7, process 700 may include determining observed network performance information based on the obtained information (block 730). For example, SON system 210 may determine observed network performance information based on the information identifying the predictive model, the network configuration, the call trace information, the obtained measurement information, and/or the estimated measurement information.

The observed network performance information may include an uplink RSSI associated with base station 220, an uplink SNR for information received by base station 220, a throughput associated with base station 220 (e.g., in bits per second, kilobits per second, megabits per second, a quantity of calls that were successfully routed, a quantity of sessions that base station 220 can maintain, etc.), or the like. In some implementations, the observed network performance information may include a combination of the above information (e.g., an average of network performance information values across a set of mobile devices 230, a combined throughput of multiple base stations 220, etc.).

As further shown in FIG. 7, process 700 may include changing network configuration data, which may be based on the information identifying the network configuration, to generate changed network configuration data (block 740).

For example, SON system 210 may change the network configuration data of mobile network 240 to determine a possible changed network configuration data. SON system 210 may change the network configuration data to attempt to improve network performance, as identified by the network performance information. For example, SON system 210 may change the network configuration data to attempt to improve an RSCP, an RSSI, an Ec, an NO, an SNR, a throughput, or the like, of base station 220.

In some implementations, SON system 210 may change the network configuration data by rerouting calls from a first cell/base station 220 to a second cell/base station 220, by changing a power level of a signal transmitted by base station 220 and/or mobile device 230, by changing a cell geometry, by changing a signal modulation scheme, by changing a signal coding scheme, or by performing a similar action.

As further shown in FIG. 7, process 700 may include determining predicted network performance information based on the changed network configuration data and based on the predictive model (block 750). For example, SON system 210 may determine predicted network performance information based on the changed network configuration data and based on the predictive model. In some implementations, SON system 210 may input parameters of the changed network configuration data to the predictive model, and the predictive model may output the predicted network performance information. In some implementations, SON system 210 may determine the predicted network performance information based on an output of the predictive model. For example, the predictive model may output predicted call trace information and/or predicted measurement information based on the changed network configuration data information, and SON system 210 may determine the predicted network performance information based on the predicted call trace information and/or predicted measurement information.

As further shown in FIG. 7, process 700 may include selectively transmitting the changed network configuration data based on comparing the predicted network performance information to the observed network performance information (block 760). For example, SON system 210 may compare the predicted network performance information to the observed network performance information. If the predicted network performance information indicates an improvement of network performance relative to the observed network performance information, SON system 210 may transmit the changed network configuration data to cause the changed network configuration data to be implemented.

If the predicted network performance information does not indicate an improvement of network performance based on the changed network configuration data, SON system 210 may not cause the network configuration data to be adjusted. In such a case, SON system 210 may generate another changed network configuration data, may determine predicted network performance information for the other changed network configuration data, and may accordingly cause the network configuration data to be adjusted or generate yet another changed network configuration data. In this way, SON system 210 may iteratively adjust the network configuration data, which iteratively improves network performance over time.

In some implementations, SON system 210 may determine configuration actions to perform to cause the network configuration data to be adjusted. For example, SON system 210 may determine one or more configuration actions to be performed (e.g., by base station 220), with regard to an uplink, based on an updated power level, an updated cell geometry, an updated signal modulation/coding scheme, or the like. The configuration action may include, for example, modifying transmitted power levels, neighbor cell relation tables, antenna electrical tilts, antenna mechanical tilts, antenna pointing direction/angles (e.g., elevation, tilt, and/or azimuth), handover thresholds, or the like. In some implementations, SON system 210 may recommend deactivating one or more base stations 220 and/or activating one or more base stations 220. In this way, SON system 210 may determine configuration actions to perform with regard to an uplink of base station 220 to adjust network configuration data, which improves performance of the uplink and thus improves mobile network performance.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
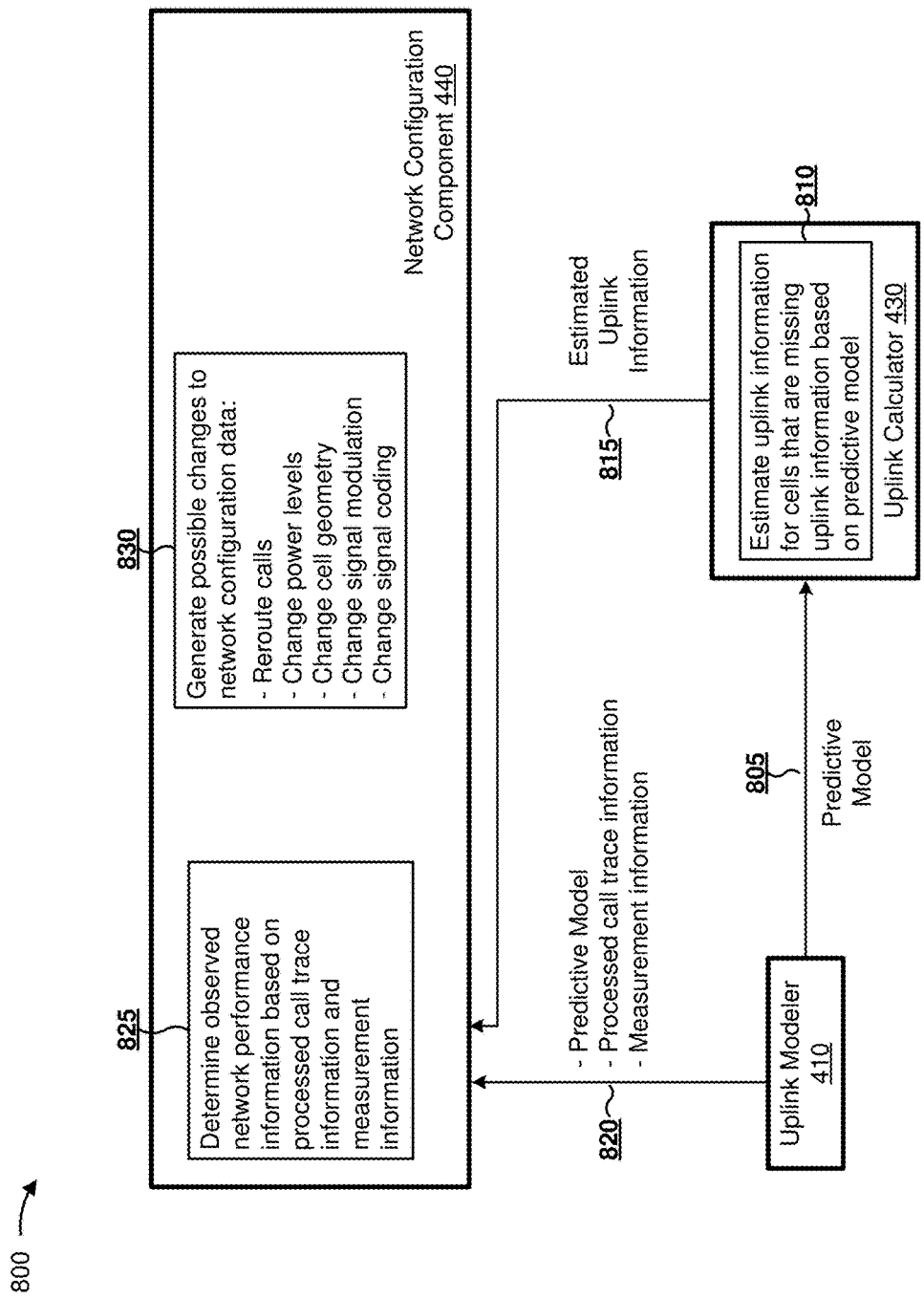
FIGS. 8A-8C are diagrams of an example implementation relating to the example process shown in FIG. 7.
Figure 8B:
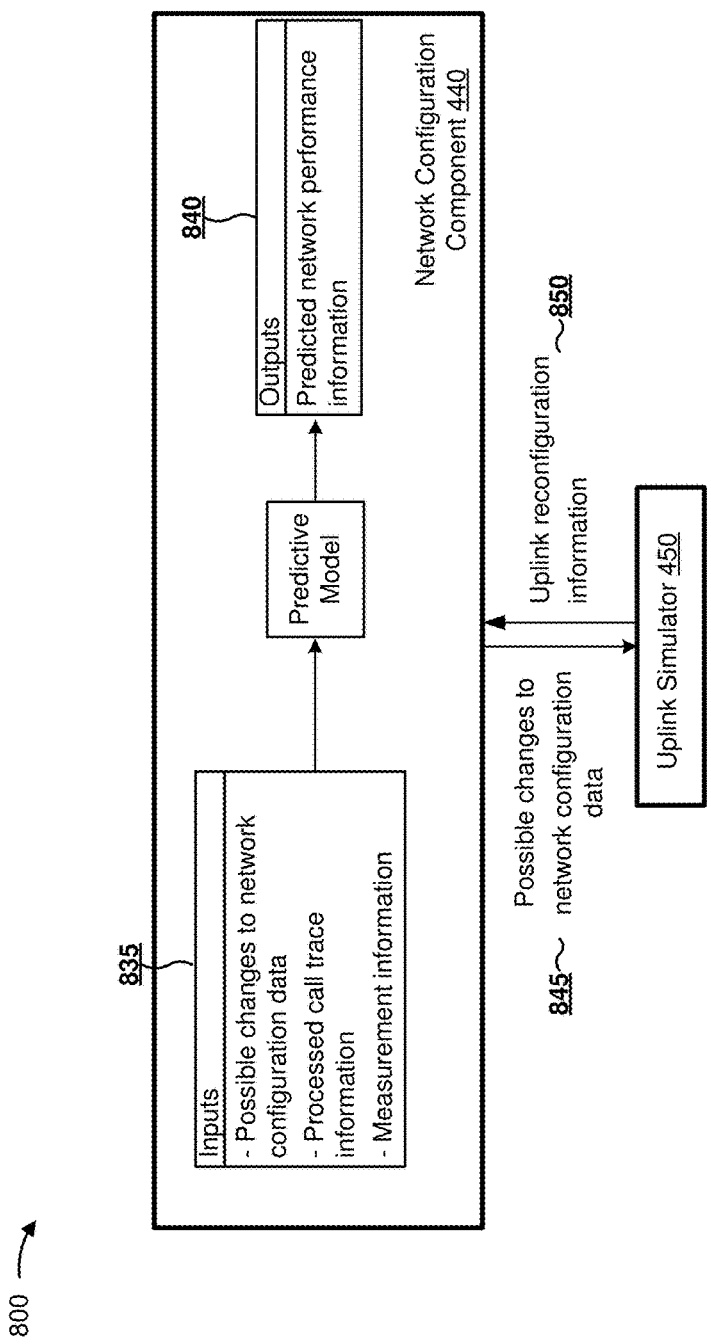
Figure 8C:
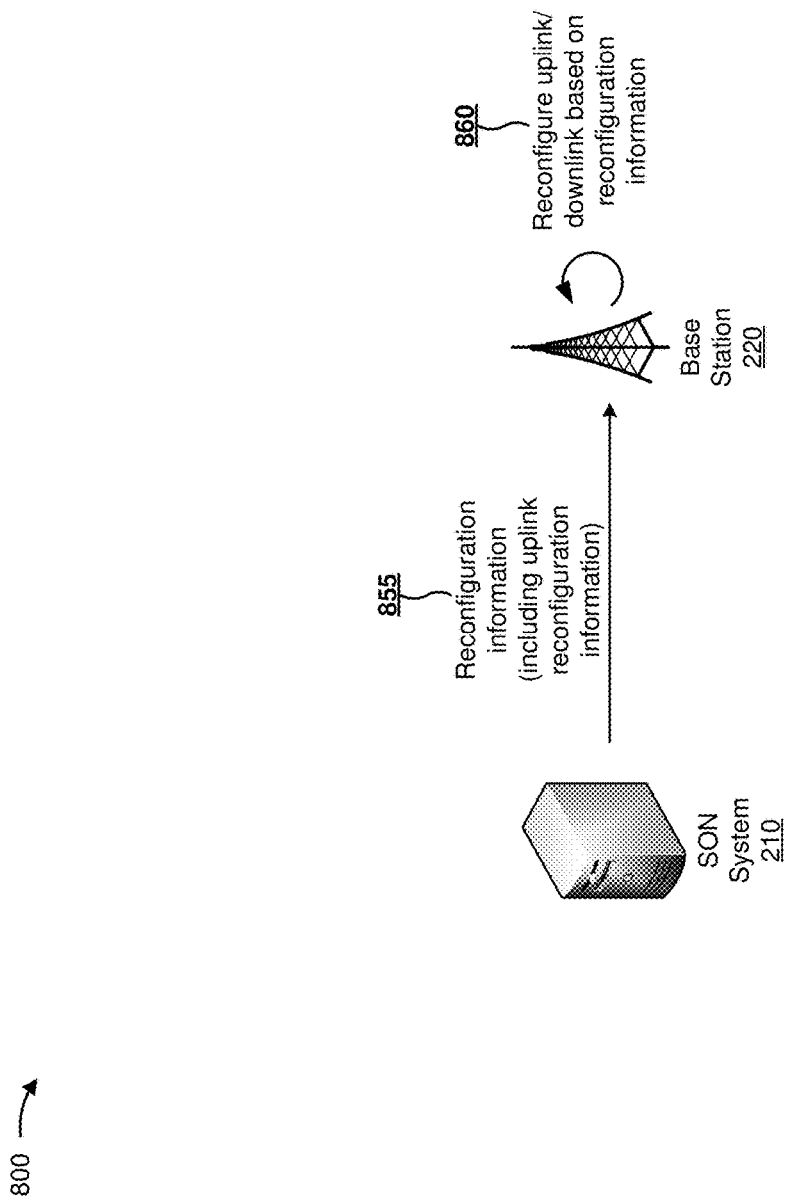

FIGS. 8A-8C are diagrams of an example implementation 800 relating to example process 700 shown in FIG. 7. FIGS. 8A-8C show an example of configuring a mobile network based on a predictive model.

As shown in FIG. 8A, and by reference number 805, uplink modeler 410 may provide information identifying a predictive model to uplink calculator 430. As shown by reference number 810, uplink calculator 430 may estimate uplink information for cells that are missing uplink information based on the predictive model. For example, uplink calculator 430 may input call trace information relating to the cells to the predictive model, or the like. As shown by reference number 815, uplink calculator 430 may provide estimated uplink information to network configuration component 440. As shown by reference number 820, uplink modeler 410 may provide the predictive model, processed call trace information, and measurement information to network configuration component 440.

As shown by reference number 825, network configuration component 440 may determine observed network performance information based on the processed call trace information and the measurement information received from uplink modeler 410. As shown by reference number 830, network configuration component 440 may generate possible changes to network configuration data, such as rerouting calls, changing power levels of base station 220 and/or mobile device 230, changing cell geometry, changing signal modulation, changing signal coding, or the like.

As shown in FIG. 8B, and by reference number 835, network configuration component 440 may input, to the predictive model, the possible changes to the network configuration data, the processed call trace information, and the measurement information. As shown by reference number 840, the predictive model may output predicted network performance information. Assume that network configuration component 440 compares the predicted network performance information to the observed network performance information to determine whether to implement the changes to the network configuration data. Assume further that network configuration component 440 determines to implement the changes to the network configuration data. As shown by reference number 845, network configuration component 440 may provide information identifying the possible changes to the network configuration data to uplink simulator 450. As shown by reference number 850, based on the possible changes to the network configuration, uplink simulator 450 may provide uplink reconfiguration information to network configuration component 440. The uplink reconfiguration information may identify operations to perform to reconfigure base station 220 based on the changes to the network configuration data.

As shown in FIG. 8C, and by reference number 855, SON system 210 may provide reconfiguration information, including the uplink reconfiguration information, to base station 220. As shown by reference number 860, base station 220 may reconfigure uplinks and/or downlinks based on the reconfiguration information. In this way, SON system 210 reconfigures mobile network 240 based on a predictive model, which improves efficiency of mobile network 240 and reduces uncertainty in implementing network changes.

As indicated above, FIGS. 8A and 8B are provided merely as an example. Other examples are possible and may differ from what was described with regard to FIGS. 8A and 8B.

Figure 9:
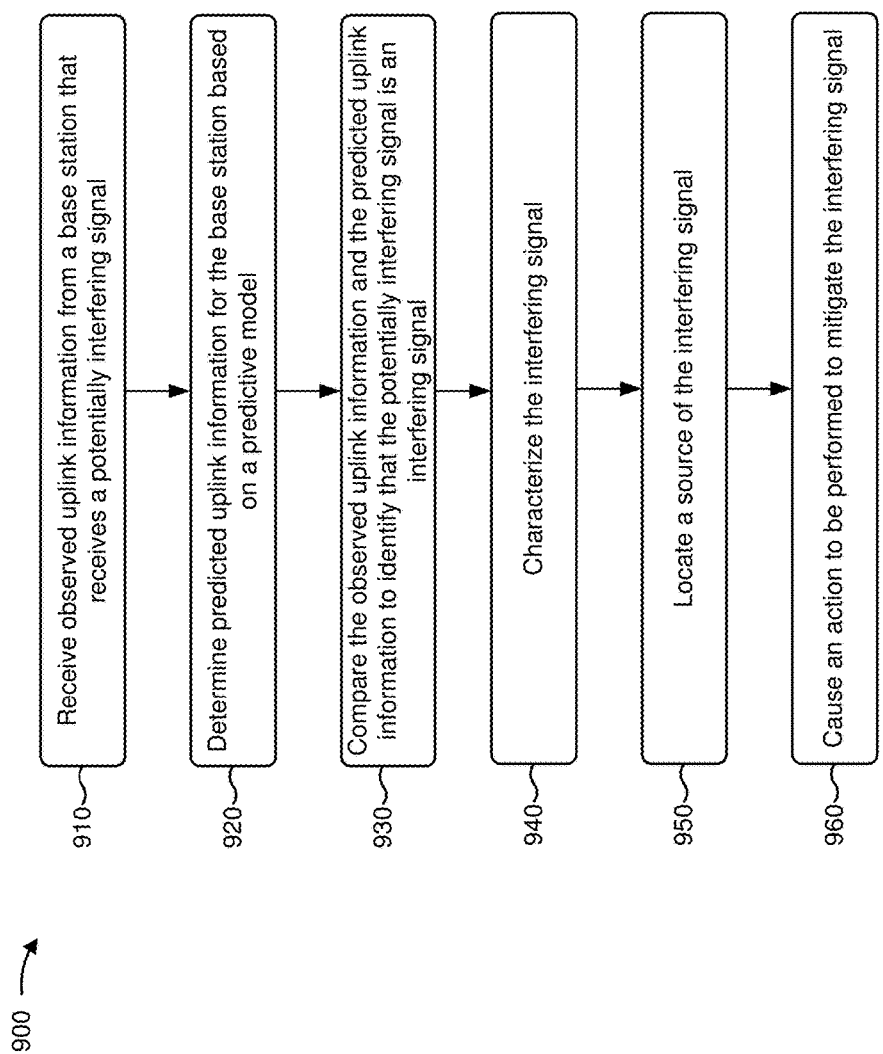
FIG. 9 is a flow chart of an example process for identifying and mitigating interference based on a predictive model.

FIG. 9 is a flow chart of an example process 900 for identifying and mitigating interference based on a predictive model. In some implementations, one or more process blocks of FIG. 9 may be performed by SON system 210. In some implementations, one or more process blocks of FIG. 9 may be performed by another device or a group of devices separate from or including SON system 210, such as base station 220, mobile device 230, and network resources 245.

As shown in FIG. 9, process 900 may include receiving observed uplink information from a base station that receives a potentially interfering signal (block 910). For example, SON system 210 may receive observed uplink information from base station 220. In some implementations, SON system 210 may receive the observed uplink information in association with measurement information from base station 220, as described in more detail in connection with FIG. 5, above. Base station 220 may be associated with a source of interference. For example, the source of interference may broadcast an interfering signal that base station 220 receives, may alter a signal transmitted by mobile device 230 via the uplink, or the like. The source of interference may include, for example, a coaxial cable egress signal, a bidirectional signal amplifier, a fluorescent light, a higher-order resonance effect associated with a signal, a mobile device 230 that acts as a relay for communications to/from the network by another mobile device 230, or the like.

As further shown in FIG. 9, process 900 may include determining predicted uplink information for the base station based on a predictive model (block 920). For example, SON system 210 may determine predicted uplink information for base station 220 based on a predictive model. The predictive model may predict uplink information, for a particular base station 220, based on measurement information and/or call trace information associated with the particular base station 220. SON system 210 may generate and/or train the predictive model, as described in more detail in connection with block 550 of FIG. 5, above.

As further shown in FIG. 9, process 900 may include comparing the observed uplink information and the predicted uplink information to identify that the potentially interfering signal is an interfering signal (block 930). For example, SON system 210 may compare the observed uplink information and the predicted uplink information to identify the interfering signal. In some implementations, SON system 210 may determine whether an interfering signal is present based on whether the observed uplink information differs from the predicted uplink information by a particular threshold. If a difference between the observed uplink information and the predicted uplink information satisfies the particular threshold, then SON system 210 may determine that base station 220 has received an interfering signal. If the difference does not satisfy the particular threshold, SON system 210 may determine that base station 220 has not received an interfering signal.

As further shown in FIG. 9, process 900 may include characterizing the interfering signal (block 940). For example, SON system 210 may characterize the interfering signal by determining a frequency of the interfering signal, an amplitude of the interfering signal, an arrival time of the interfering signal, whether a source of the interfering signal is stationary or mobile, or the like.

SON system 210 may analyze the interfering signal to characterize the interfering signal. For example, SON system 210 may analyze sub-band effects to determine a frequency range associated with the interfering signal. As another example, SON system 210 may analyze errors in physical resource blocks to determine a length of details in the interfering signal. As another example, SON system 210 may determine an impact, of the interfering signal, in the time domain, to determine the length of details in the interfering signal. As yet another example, SON system 210 may determine whether the amplitude of the interfering signal is constant or variable. As another example, SON system 210 may analyze changes in the frequency signature of the interfering signal to determine whether the source of the interfering signal is stationary or mobile. As yet another example, SON system 210 may analyze individual symbols (e.g., bits, bytes, etc.) of signals received by base station 220 to determine a time of arrival of the interfering signal.

In some implementations, an interfering signal may be received by multiple base stations 220. For example, the interfering signal may reach multiple cells and, thus, may be received by multiple base stations 220. In such a case, SON system 210 may characterize the interfering signal for two or more of the multiple base stations 220. By characterizing the interfering signal with regard to two or more base stations 220, SON system 210 may improve accuracy of locating a source of the interference, as described in more detail below.

As further shown in FIG. 9, process 900 may include locating a source of the interfering signal (block 950). For example, SON system 210 may locate a source of the interference. To locate the source of the interference, SON system 210 may analyze measurement information received from one or more base stations 220. In some implementations, SON system 210 may analyze measurement information received from multiple, different base stations 220, which improves accuracy of the location.

SON system 210 may analyze measurement information, configuration information and/or characterization information to locate a source of the interfering signal. For example, SON system 210 may compare amplitudes and/or times of arrival associated with different base stations 220 to locate the source. As another example, SON system 210 may analyze an angle of arrival of the interfering signal and/or the antenna pattern generated by the interfering signal to locate the source. As yet another example, SON system 210 may determine whether the frequency of the interfering signal covers multiple frequency bands and/or carrier bands.

As another example, SON system 210 may use characterization information from multiple base stations 220 to determine whether a particular interfering signal is received by the multiple base stations 220. If the particular interfering signal is received by the multiple base stations 220, SON system 210 may analyze measurement information and/or configuration information for the multiple base stations 220 to generate a set of possible locations for the source, and to attempt to narrow down the location of the source from the set of possible locations. In this way, SON system 210 locates a source of an interfering signal, which facilitates mitigation of the interfering symbol and improves network performance.

As further shown in FIG. 9, process 900 may include causing an action to be performed to mitigate the interfering signal (block 960). For example, SON system 210 may cause an action to be performed to mitigate the interfering signal. In some implementations, SON system 210 may determine changed network configuration data to mitigate the interfering signal, and may perform operations described in connection with FIGS. 5 and 7, above. In this way, SON system 210 may use a predictive model to change network configuration data, which improves network performance and/or simplifies implementation of the changed network configuration data.

In some implementations, SON system 210 may cause an action to be performed. For example, SON system 210 may cause base station 220 to hand over mobile devices 230 (e.g., onto another base station 220, another frequency band, another cell, etc.). As another example, SON system 210 may cause base station 220 to tilt an antenna downward to reduce a size of a cell served by base station 220. As another example, SON system 210 may perform a voltage standing wave ratio test with regard to base station 220 to determine an amount of power reflected by antennas of base station 220. As another example, SON system 210 may provide a notification to an entity (e.g., a network administrator, an engineer, a technician to perform a drive test to determine a physical location of the source of interference, etc.). As another example, SON system 210 may narrow a bandwidth of base station 220 to exclude the frequency of the interfering signal. As another example, SON system 210 may remove one or more network resources 245 from uplink scheduling. As another example, SON system 210 may change a downlink frequency of a downlink between base station 220 and one or more mobile devices 230. In some implementations, SON system 210 may perform another type of action. In this way, SON system 210 characterizes, locates, and mitigates an interfering signal based on call trace information and/or measurement information, which reduces noise at base station 220 and improves network performance.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10A:
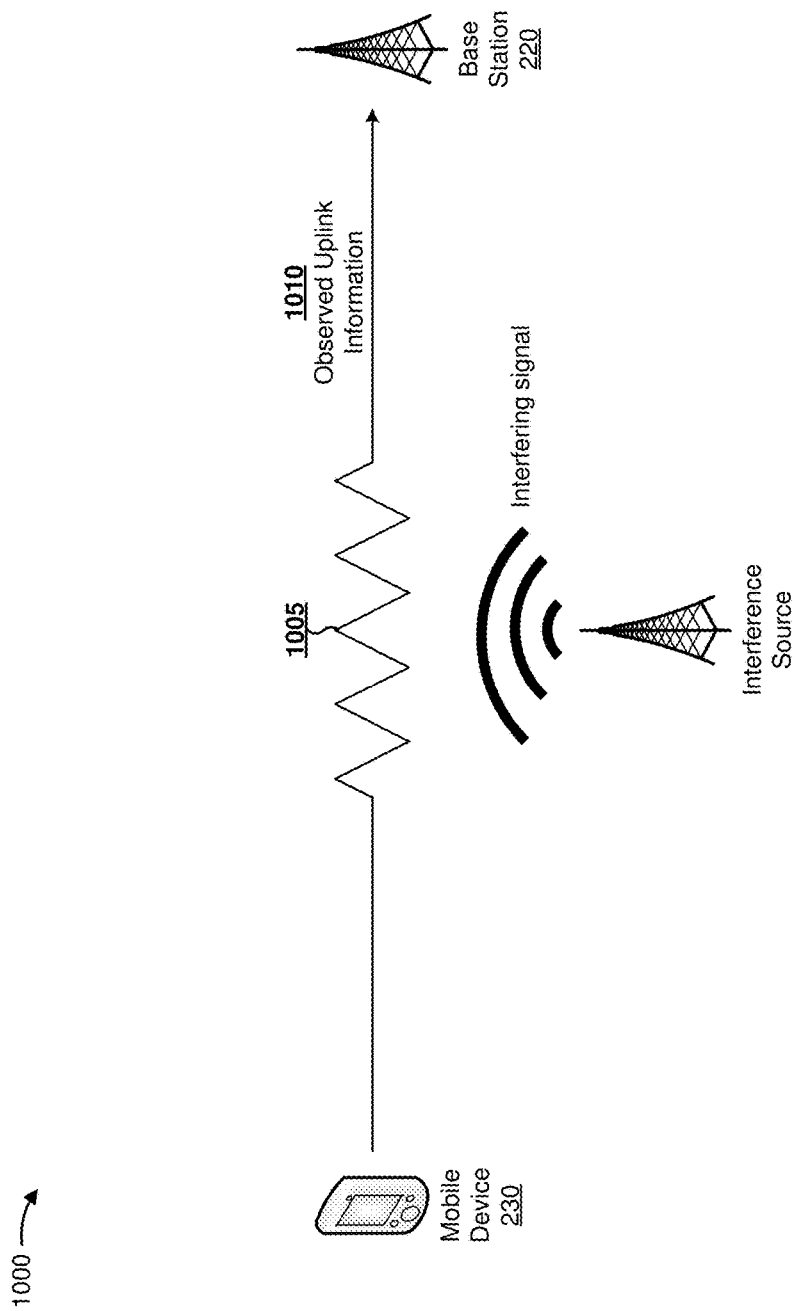
FIGS. 10A-10C are diagrams of an example implementation relating to the example process shown in FIG. 9.
Figure 10B:
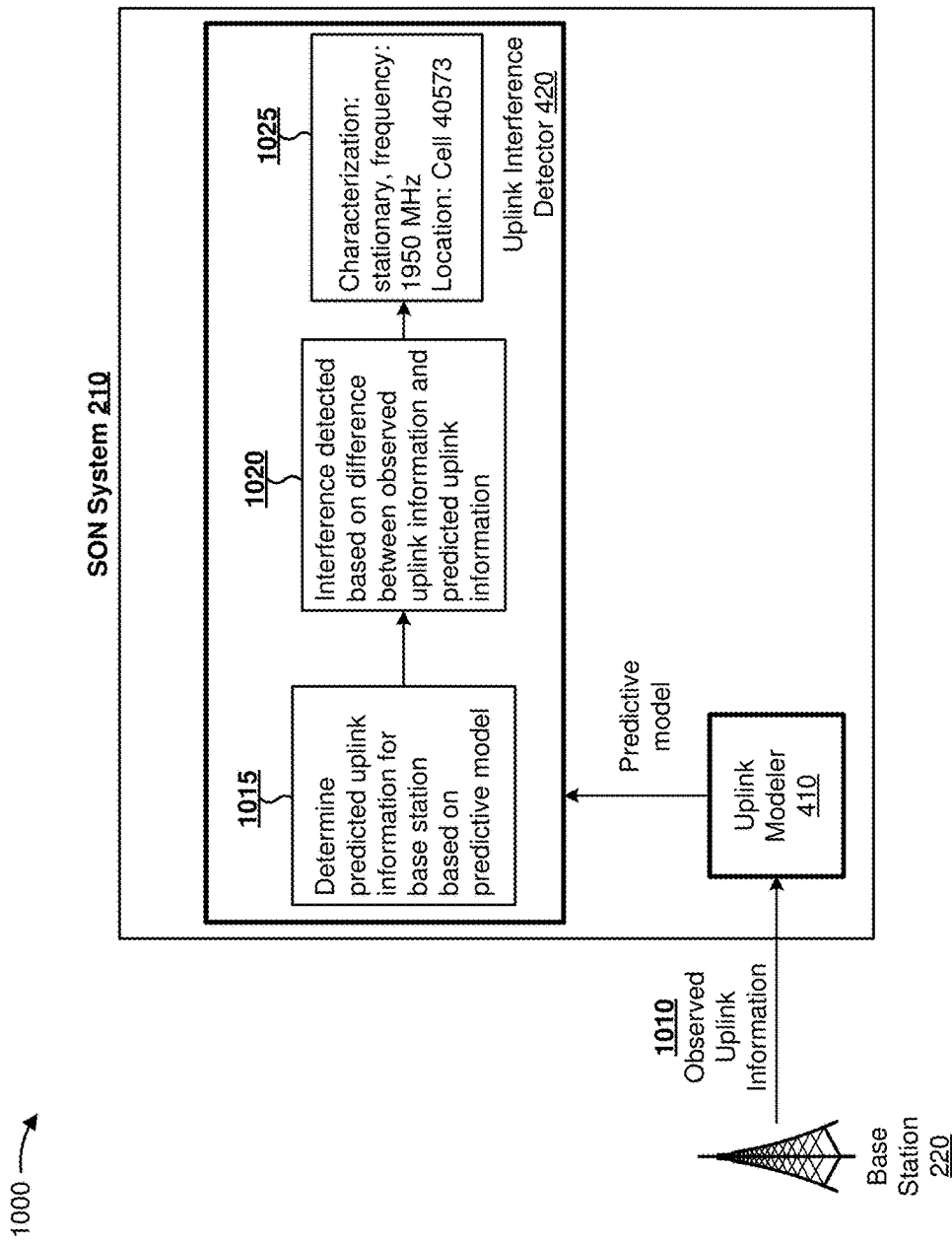
Figure 10C:
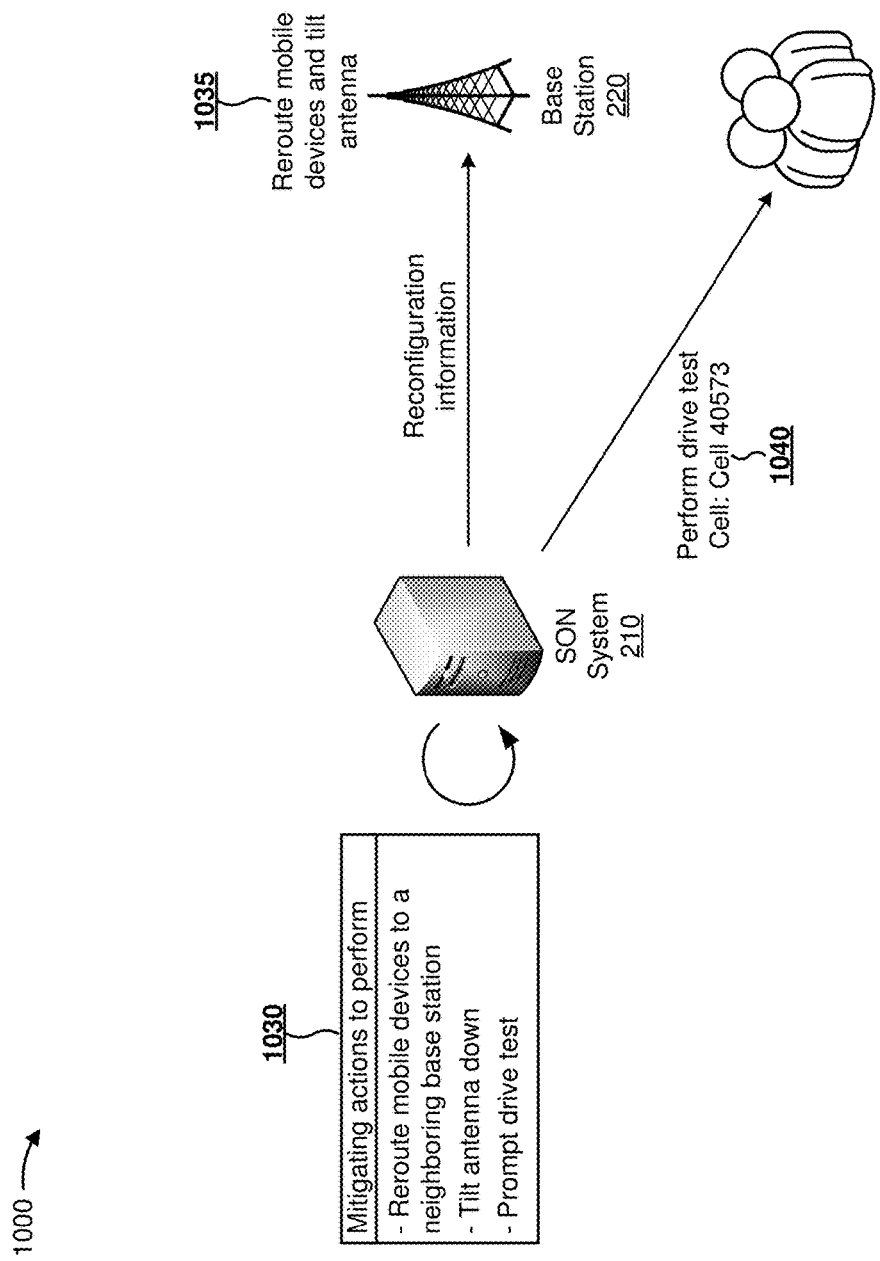

FIGS. 10A-10C are diagrams of an example implementation 1000 relating to example process 900 shown in FIG. 9. FIGS. 10A-10C show an example of identifying and mitigating interference based on the predictive model.

As shown in FIG. 10A, mobile device 230 may provide a signal to base station 220 via an uplink. As shown by reference number 1005, base station 220 may receive an interfering signal from an interference source. As shown by reference number 1010, base station 220 may receive observed uplink information 1010, which may differ from uplink information transmitted by mobile device 230 based on the interfering signal.

As shown in FIG. 10B, SON system 210 may provide observed uplink information 1010 to uplink modeler 410. As further shown, uplink modeler 410 may generate/train a predictive model based on observed uplink information 1010 and other information, and may provide the predictive model to uplink interference detector 420. As shown by reference number 1015, uplink interference detector 420 may determine predicted uplink information for base station 220 based on the predictive model. As shown by reference number 1020, uplink interference detector 420 may detect the interfering signal based on a difference between the observed uplink information and the predicted uplink information. As shown by reference number 1025, uplink interference detector 420 may characterize the interfering signal, and may locate a source of the interfering signal. Here, the interfering signal is associated with a stationary source and a frequency of 1950 megahertz (MHz), and a source of the interfering signal is located in cell 40573.

As shown in FIG. 10C, and by reference number 1030, SON system 210 may determine mitigating actions to perform to mitigate the interfering signal. Here, SON system 210 hands over mobile devices 230 to a neighboring base station 220, causes base station 220 to tilt an antenna downward, and prompts an engineering team to perform a drive test. As shown by reference number 1035, SON system 210 may provide reconfiguration information to base station 220, and base station 220 may hand over mobile devices 230 and tilt the antenna downward based on the reconfiguration information. As shown by reference number 1040, SON system 210 may prompt a team of engineers to perform a drive test in cell 40573. In this way, SON system 210 identifies, characterizes, and locates an interfering signal based on a predictive model, which permits SON system 210 to cause mitigating actions to be performed to improve uplink performance.

As indicated above, FIGS. 10A-10C are provided merely as an example. Other examples are possible and may differ from what was described with regard to FIGS. 10A-10C.

In this way, SON system 210 predicts outcomes of network reconfiguration based on a predictive model, which improves performance of the network reconfiguration, increases mobile network capacity, and reduces mobile network interference. Further, SON system 210 locates and mitigates sources of cellular interference, which improves cellular uplink performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for improving network performance, comprising:
one or more processors of a self-optimizing network system configured to:
obtain uplink information associated with a base station of a network;
obtain downlink information associated with a mobile device in communication with the base station;
train a predictive model, based on the uplink information and the downlink information, to predict network performance information;
determine predicted uplink information for the base station based on the predictive model;
receive measurement information from the base station including observed uplink information for a particular time interval;
compare the predicted uplink information and the observed uplink information to determine that the base station receives an interfering signal during the particular time interval based on the observed uplink information differing from the predicted uplink information by a threshold amount,
the interfering signal being different than a signal used to communicate with the base station, and the interfering signal altering a signal transmitted by the mobile device, and
a source of the interfering signal including at least one of a repeater, a coaxial cable egress, a signal amplifier, a light bulb, or a relay for communications with the network;
analyze the interfering signal to determine a characteristic of the interfering signal; and
cause, by the one or more processors, an action to be performed to mitigate the interfering signal based on the characteristic of the interfering signal.

2. The device of claim 1, where the predictive model is determined using an input that includes one or more of:
the downlink information, or
network configuration data;
where the predicted uplink information is estimated uplink information; and
where the one or more processors, when obtaining the estimated uplink information, are to:
determine the estimated uplink information based on inputting at least one of the downlink information or the network configuration data into the predictive model.

3. The device of claim 2, where the one or more processors are to:
receive the observed uplink information,
the observed uplink information being associated with the base station.

4. The device of claim 1, where the one or more processors, when obtaining the downlink information, are to:
receive downlink information from a plurality of mobile devices associated with a plurality of cells.

5. The device of claim 1, where the uplink information is associated with an uplink between the base station and the mobile device; and
where the downlink information is associated with a downlink between the base station and the mobile device.

6. The device of claim 1, where the predictive model is a first predictive model and the network performance information is first predicted network performance information; and
where the one or more processors are to:
determine a second predictive model based on the uplink information, the downlink information, and the first predicted network performance information,
the second predictive model predicting second predicted network performance information that is different than the first predicted network performance information.

7. The device of claim 1, where the uplink information includes one or more of:
a frequency of a downlink channel provided by the base station,
an uplink received signal strength indicator associated with the base station,
an uplink signal-to-noise ratio for information received by the base station,
an uplink modulation and coding scheme associated with the base station, or
a throughput associated with the base station.

8. A non-transitory computer-readable medium storing instructions, the instructions comprising:
one or more instructions that, when executed by one or more processors of a self-optimizing network system, cause the one or more processors to:
obtain uplink information associated with a base station of a network;
obtain downlink information associated with a mobile device in communication with the base station;
train a predictive model to predict network performance information based on the uplink information and the downlink information;
determine predicted uplink information for the base station based on the predictive model;
receive measurement information from the base station including observed uplink information for a particular time interval;
compare the predicted uplink information and observed uplink information to determine that the base station receives an interfering signal during the particular time interval based on the observed uplink information differing from the predicted uplink information by a threshold amount, the interfering signal being different than a signal used to communicate with the base station, and the interfering signal altering a signal transmitted by the mobile device, and
  a source of the interfering signal including at least one of a repeater, a coaxial cable egress, a signal amplifier, a light bulb, or a relay for communications with the network;
 analyze the interfering signal to determine a characteristic of the interfering signal; and
 cause, when the one or more instructions are executed by the one or more processors, an action to be performed to mitigate the interfering signal based on the characteristic of the interfering signal.

9. The non-transitory computer-readable medium of claim 8, where the one or more instructions, when executed by the one or more processors, cause the one or more processors to:
 characterize the interfering signal based on at least one of:
  a frequency range of the interfering signal,
  a time of arrival of the interfering signal,
  whether the source of the interfering signal is moving,
  an amplitude of the interfering signal, or
  a detail width of details of the interfering signal.

10. The non-transitory computer-readable medium of claim 8, where the one or more instructions, when executed by the one or more processors, further cause the one or more processors to locate the source of the interfering signal.

11. The non-transitory computer-readable medium of claim 10, where the base station is a first base station; and
 where the one or more instructions, that cause the one or more processors to locate the source of the interfering signal, cause the one or more processors to:
  locate the source of the interfering signal by comparing uplink information from a second base station and the observed uplink information from the first base station.

12. The non-transitory computer-readable medium of claim 11, where the one or more instructions, that cause the one or more processors to locate the source of the interfering signal, cause the one or more processors to:
 locate the source of the interfering signal based on amplitudes of the interfering signal and times of arrival of the interfering signal at the first base station and the second base station.

13. The non-transitory computer-readable medium of claim 11, where the one or more instructions, that cause the one or more processors to locate the source of the interfering signal, cause the one or more processors to:
 locate the source of the interfering signal based on angles of arrival and antenna patterns of the interfering signal at the first base station and the second base station.

14. The non-transitory computer-readable medium of claim 8, where the one or more instructions, that cause the one or more processors to cause the action to be performed, cause the one or more processors to at least one of:
 cause the base station to change an amount of tilt of an antenna,
 cause the base station to hand over the mobile device to another base station,
 cause the base station to hand over the mobile device to another frequency,
 cause the base station to hand over the mobile device to another carrier,
 cause the base station to remove one or more network resources from uplink scheduling,
 cause the base station to narrow a bandwidth of communication with the mobile device, or
 cause the base station to change a frequency associated with a downlink to the mobile device.

15. A method, comprising:
 obtaining, by a device of a self-optimizing network system, uplink information associated with a base station of a network;
 obtaining, by the device, downlink information associated with a mobile device in communication with the base station;
 training, by the device, a predictive model to predict network performance information based on the uplink information and the downlink information;
 determining, by the device, predicted uplink information for the base station based on the predictive model;
 receiving, by the device, measurement information from the base station including observed uplink information for a particular time interval;
 comparing, by the device, the predicted uplink information and observed uplink information to determine that the base station receives an interfering signal during the particular time interval based on the observed uplink information differing from the predicted uplink information by a threshold amount,
  the interfering signal being different than a signal used to communicate with the base station, and the interfering signal altering a signal transmitted by the mobile device;
 analyzing, by the device, the interfering signal to determine a characteristic of the interfering signal, and
  a source of the interfering signal including at least one of a repeater, a coaxial cable egress, a signal amplifier, a light bulb, or a relay for communications with the network; and
 causing, by the device, an action to be performed to mitigate the interfering signal based on the characteristic of the interfering signal.

16. The method of claim 15, further comprising:
 changing network configuration data associated with the base station to generate changed network configuration data,
 where changing the network configuration data comprises:
  changing the network configuration data to improve network performance with regard to the downlink information associated with the mobile device.

17. The method of claim 16, where changing the network configuration data comprises:
 changing the network configuration data to improve at least one of:
  a probability of a dropped call,
  a probability of a blocked call,
  a power headroom of the mobile device,
  a downlink received signal code power,
  an uplink received signal strength indicator,
  an uplink signal to noise ratio,
  an uplink throughput,
  a downlink energy per chip, or
  a downlink noise power density.

18. The method of claim 15, where the predictive model is determined using an input that includes:
 information regarding network configuration data; and
 where determining the predicted uplink information comprises:
  determining the predicted uplink information based on inputting at least one of the downlink information or the network configuration data into the predictive model.

19. The method of claim 18, further comprising:
obtaining the observed uplink information,
where obtaining the observed uplink information comprises:
- determining the observed uplink information for the base station based on uplink information for neighboring base stations.

20. The method of claim 18, where the predicted uplink information is estimated uplink information.

* * * * *